United States Patent
Michel et al.

(10) Patent No.: US 9,030,941 B2
(45) Date of Patent: May 12, 2015

(54) POWER SAVING PROCEDURE IN COMMUNICATIONS NETWORK

(75) Inventors: Juergen Michel, Munich (DE); Clemens Suerbaum, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 195 days.

(21) Appl. No.: 13/704,514

(22) PCT Filed: Jun. 16, 2010

(86) PCT No.: PCT/EP2010/058450
§ 371 (c)(1), (2), (4) Date: Feb. 5, 2013

(87) PCT Pub. No.: WO2011/157290
PCT Pub. Date: Dec. 22, 2011

(65) Prior Publication Data
US 2013/0135994 A1 May 30, 2013

(51) Int. Cl.
H04W 52/02 (2009.01)
H04W 24/02 (2009.01)
H04W 24/08 (2009.01)
H04W 88/08 (2009.01)
H04W 92/20 (2009.01)

(52) U.S. Cl.
CPC .......... *H04W 52/0206* (2013.01); *H04W 24/02* (2013.01); *H04W 24/08* (2013.01); *H04W 88/08* (2013.01); *H04W 92/20* (2013.01); *Y02B 60/50* (2013.01)

(58) Field of Classification Search
CPC ...................................... H04W 52/02

USPC .......................... 370/229, 241, 311, 350, 328
See application file for complete search history.

(56) References Cited

U.S. PATENT DOCUMENTS

| | | | | |
|---|---|---|---|---|
| 5,822,311 A * | 10/1998 | Hassan et al. | | 370/322 |
| 6,259,681 B1 * | 7/2001 | Kolev et al. | | 370/311 |
| 6,690,655 B1 * | 2/2004 | Miner et al. | | 370/278 |
| 6,934,539 B2 * | 8/2005 | Laroia et al. | | 455/421 |
| 8,023,443 B2 * | 9/2011 | Zakrzewski | | 370/311 |

(Continued)

FOREIGN PATENT DOCUMENTS

EP 2 056 628 A1 5/2009

OTHER PUBLICATIONS

3GPP TSG-SA5 (Telecom Management), S5-101765, Meeting SA5#72, Jul. 12-16, 2010, Slovak Republic, Nokia Siemens Networks, "Sensor Mode While Energy Saving", (4 pages).

(Continued)

*Primary Examiner* — Rasheed Gidado
(74) *Attorney, Agent, or Firm* — Harrington & Smith

(57) ABSTRACT

There is proposed a mechanism for power saving procedures to be conducted in transmission network nodes, such as base stations or the like, in a heterogeneous network environment. A transmission node is set to operate in a sensor mode for conducting traffic monitoring when an operation mode of the transmission node is an inactive state. Information necessary for the traffic monitoring by the transmission node based on detection of random access channel (RACH) signals of neighboring cells is provided. On the basis of results of the monitoring of RACHs of the neighboring cells, it is determined whether the inactive transmission node is to be reactivated.

20 Claims, 9 Drawing Sheets

(56) References Cited

U.S. PATENT DOCUMENTS 8,351,960 B2* 1/2013 Lister .................... 455/456.5
2006/0160558 A1* 7/2006 Kim et al. .................... 455/522

OTHER PUBLICATIONS

3GPP TSG-RAN WG3#66bis, Valencia, Spain, Jan. 18-22, 2010, R3-100162, "overview to LTE energy saving solutions to cell switch off/on", Huawei, 5 pgs.
3GPP TR.826 V10.0.0 (Mar. 2010), "$3^{rd}$Generation Partnership Project: Technical Specification Group Services and System Aspects: Telecommunication management; study on energy savings management (ESM) (Release 10)", 33 pgs.
3GPP TS 23.401 V9.4.0 (Mar. 2010), "$3^{rd}$Generation Partnership Project; Technical Specification Group Services and System Aspects; General Packet Radio Service (GPRS) enhancements for Evolved Universal Terrestrial Radio Access Network (E-UTRAN) access (Release 9)", 258 pgs.
3GPP TS 32.762 V9.3.0 (Mar. 2010), "$3^{rd}$Generation Partnership Project; Technical Specification Group Services and System Aspects; Telecommunication management; Evolved Universal Terrestrial Radio Access Network (E-UTRAN) Network resource model (NRM) Integration Reference point (IRP): Information service (IS) (Release 9)", 24 pgs.
3GPP TS 36.300 V11.3.0 (Sep. 2012), "$3^{rd}$Generation Partnership Project; Technical Specification Group Radio Access Network: Evolved Universal Terrestrial Radio Access Network (E-UTRAN) and Evolved universal Terrestrial Radio Access Network (E-UTRAN); overall description; Stage 2 (Release 11)", 205 pgs.
3GPP TS 36.423 V9.2.0 (Mar. 2010), "$3^{rd}$Generation Partnership Project; Technical Specification Group Radio Access Network; Evolved Universal Terrestrial Radio Access Network (E-UTRAN); X2 application protocol (X2AP) (Release 9)", 120 pgs.

* cited by examiner

POWER SAVING PROCEDURE IN COMMUNICATIONS NETWORK

BACKGROUND OF THE INVENTION

1. Field of the Invention

The present invention relates to power saving procedures conducted in a communication network. In particular, the present invention relates to a method, apparatus and computer program product providing a mechanism for power saving procedures to be conducted in transmission network nodes, such as base stations or the like, in a heterogeneous network environment.

2. Related background Art

Prior art which is related to this technical field can e.g. be found by the technical specifications TS 32.762 (current version: 9.3.1), TS 23.401 (current version: 9.4.0), TS 36.423 (current version: 9.2.0) and technical report TR 32.826 (current version: a.0.0) etc. of the 3GPP.

The following meanings for the abbreviations used in this specification apply:
3GPP—3rd generation partnership project
DL—downlink
eNB—enhanced node B (base station)
ES—energy saving
EUTRAN—enhanced UTRAN
FDD—frequency division duplexing
IOC—information object class
IoT—interference over thermal
IP—Internet protocol
LTE—long term evolution
OAM—operation, administration and maintenance (or management)
RACH—random access channel
RAN—radio access network
RX—reception
SOON—self-organized and optimized network
TX—transmission
UE—user equipment
UL—uplink
UTRAN—universal terrestrial RAN In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) communication networks like the Universal Mobile Telecommunications System (UMTS), enhanced communication networks based e.g. on LTE, cellular 2nd generation (2G) communication networks like the Global System for Mobile communications (GSM), the General Packet Radio System (GPRS), the Enhanced Data Rates for Global Evolutions (EDGE), or other wireless communication system, such as the Wireless Local Area Network (WLAN) or Worldwide Interoperability for Microwave Access (WiMAX), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards for telecommunication network and access environments.

Generally, for properly establishing and handling a communication connection between network elements such as a UE and another communication equipment, such as a data base, a server, etc., one or more intermediate network elements, such as network control nodes, support nodes, service nodes and interworking elements are involved which may belong to different communication networks.

Low power consumption is an important performance indicator for communication network operators and the users of a cellular phone. At present, power consumption of a UE is typically described in terms of battery life time, and more specifically in terms of talk time and standby time. On the network side the power consumption is described as the power consumption of network elements, such as transmission nodes or access nodes, wherein power consumption is measured for different configuration and load situations.

In principle the access node power consumption for zero load over the air interface could be seen then as the standby time of an access node. It is to be expected that those measures are playing more and more important role in the node design and network configuration.

On the other hand, with regard to the UE, for the terminal standby time, it is necessary to take into account the fact that usually in wireless communication networks even if a user is not doing any call the mobile phone is consuming power. For example, when being switched on but not making any call, which is also referred to that a UE is in an idle mode, the UE usually searches periodically for its environment, e.g. synchronization sequences, reference signals and downlink broadcast channels or the like (the elements to be searched for are defined in the different communication network standards and may be different depending on the actual type of network). Furthermore, when the UE is in the idle mode, downlink pilot signals may be received, and usually it is required to permanently run circuitry by means of which paging channel information can be detected in order to get activated if a call is received.

However, a problem of such procedures conducted in the UE is that the actual power consumption caused by such a processing can be hardly foreseen and may increase remarkably in some cases. For example, in the context of so-called heterogeneous networks, power consumption in UEs caused by such a processing may be extreme. In a heterogeneous network structure, access nodes like base stations, relay nodes and low power access nodes (e.g. pico and femto access nodes) are deployed in a co-channel mode with a plurality of overlapping cell areas so as to provide a more regular user performance in connected mode and to satisfy increasing capacity needs. For such an environment, the usual environment monitoring and power saving strategies implemented in UEs are not optimal as they are not fine-tuned for those deployments. Especially the idle mode power consumption of a UE may be increased due to the increased number of access nodes per square area.

Therefore, one approach to keep power consumption at a reasonable level is to keep the number of active access nodes as low as possible, for example during network capacity off peak hours.

In detail, to keep the UE stand by time at reasonable level, complex and power consuming computations in the UE should be performed as infrequently as possible wherein it has to be ensured that the user experience (e.g. in terms of cell selection and paging delay) is not deteriorated. For example, in idle mode, corresponding operations concern operations on the synchronization sequences, reference and paging signals as well as the decoding of the DL broadcast channel.

With heterogeneous network co-channel deployments the problem however is that the number of received and decodeable signals from surrounding transmission nodes is significantly higher compared with the non-heterogeneous case.

Therefore, UE procedures like cell selection or cell reselection are triggered more frequently. Main reason for this is the high density of transmission nodes per square area which are deployed to provide the more regular user performance in connected mode and to satisfy the increasing capacity needs.

Therefore, in order to deal with this issue of increased UE battery consumption and to reduce the network power consumption in heterogeneous networks without harming the system performance, it has been proposed to switch off the capacity increasing transmission nodes, such as relay nodes and low power transmission nodes (hotspots, pico and femto nodes) when it is suitable, e.g. during off peak network times with low traffic load. For this purpose, the following solutions are proposed which are specified for a heterogeneous co-channel case:

Transmission node (such as an eNB or the like) switch off: autonomous switch off decision can be done by individual nodes e.g. based on load thresholds. Before a node is switched off the neighbor nodes are informed after the decision is made.

Transmission node (eNB) switch on: switch on should be performed upon request by one neighbor transmission node or is done by individual decision of switched off node. In case of switch on by neighbor request, the requesting node is informed about outcome of the request, and all other neighbors are informed in case of switch on.

SUMMARY OF THE INVENTION

It is an object of the invention to provide an apparatus, method and computer program product by means of which an improved power saving procedure can be executed in a communication network. In particular, it is an object of the invention to provide an apparatus, method and computer program product which provide an improved mechanism for controlling activation/deactivation of transmission network nodes, such as base stations, eNBs or the like for performing optimized power saving procedures in a heterogeneous network environment and the like.

These objects are achieved by the measures defined in the attached claims.

According to an example of the proposed solution, there is provided, for example, an apparatus comprising a receiver configured to receive a setting information indicating to operate in a sensor mode when an operation mode of the apparatus is changed to an inactive state, wherein the sensor mode comprises traffic monitoring on at least one uplink random access channel of at least one neighboring cell, a processing portion configured to change the operation mode of the apparatus to the inactive state when a predetermined condition is met, and a monitor portion configured to conduct traffic monitoring of random access channel signals detectable by the apparatus on at least one uplink random access channel of at least one neighboring cell when the apparatus is in the inactive state.

Furthermore, according to an example of the proposed solution, there is provided, for example, a method comprising receiving a setting information indicating to operate in a sensor mode when an operation mode is changed to an inactive state, wherein the sensor mode comprises traffic monitoring on at least one uplink random access channel of at least one neighboring cell, changing the operation mode to the inactive state when a predetermined condition is met, and conducting traffic monitoring of random access channel signals on at least one uplink random access channel of at least one neighboring cell when the operation mode is changed to the inactive state.

According to further refinements, there may be comprised one or more of the following features:
- a traffic load of an own cell may be detected when being in an active mode, wherein the predetermined condition is met when the traffic load detected is below a predetermined first threshold;
- an indication may be transmitted to at least one neighboring cell that the apparatus enters the inactive state and operates in the sensor mode, and from the at least one neighboring cell channel sequence information and information on allowed access time intervals of at least one uplink random access channel to be monitored in the sensor mode may be received, wherein the channel sequence information and information on allowed access time intervals may be used for the traffic monitoring of the at least one uplink random access channel of the at least one neighboring cell;
- on the basis of the traffic monitoring result it may be determined whether the traffic load is greater than a second predetermined threshold, wherein a change of the operation mode from the inactive state to an active state may be triggered when the traffic load is greater than the second predetermined threshold;
- an instruction from a management network control element to change the operation mode to the inactive state may be received, wherein the predetermined condition is met when the instruction is received, and channel sequence information and information on allowed access time intervals of at least one uplink random access channel to be monitored in the sensor mode may be received from the management network control element, wherein the channel sequence information and information on allowed access time intervals may be used for the traffic monitoring of the at least one uplink random access channel of the at least one neighboring cell; in this case, a further instruction may be received from a management network control element to change the operation mode from the inactive state to an active state, wherein a change of the operation mode from the inactive state to the active state may be triggered when the further instruction is received;
- a result of the traffic monitoring of the at least one uplink random access channel of the at least one neighboring cell when being in the sensor mode may be reported to a management network control element;
- at least one of the setting information, the random access channel sequence information and the information on allowed access time intervals may be received as an attribute parameter of a specific information object class;
- the mechanism may be implemented in a transmission network element of a communication network.

In addition, according to a further example of the proposed solution, there is provided, for example, an apparatus comprising a receiver configured to receive an indication from a transmission node of a neighboring cell that the trans-mission node of the neighboring cell enters an inactive state and operates in a sensor mode, wherein the sensor mode comprises traffic monitoring on at least one uplink random access channel of the apparatus, and a transmitter configured to send to the transmission node of the neighboring cell channel sequence information and information on allowed access time intervals of at least one uplink random access channel to be monitored in the sensor mode.

Moreover, according to a further example of the proposed solution, there is provided a method comprising receiving an indication from a transmission node of a neighboring cell that the transmission node of the neighboring cell enters an inactive state and operates in a sensor mode, wherein the sensor mode comprises traffic monitoring on at least one uplink random access channel of the apparatus, and sending to the transmission node of the neighboring cell channel sequence information and information on allowed access time intervals of at least one uplink random access channel to be monitored in the sensor mode.

According to a further refinement, there may be comprised a following features that the mechanism is implemented in a transmission network element of a communication network.

Furthermore, according to a still further example of the proposed solution, there is provided, for example, an apparatus comprising a transmitter configured to send to at least one transmission network element a setting information indicating that the at least one transmission network element has to operate in a sensor mode when an operation mode of the at least one transmission network element is changed to an inactive state, wherein the sensor mode comprises traffic monitoring on at least one uplink random access channel of at least one neighboring cell of the at least one transmission network element.

In addition, according to a still further example of the proposed solution, there is provided, for example, a method comprising sending to at least one transmission network element a setting information indicating that the at least one transmission network element has to operate in a sensor mode when an operation mode of the at least one transmission network element is changed to an inactive state, wherein the sensor mode comprises traffic monitoring on at least one uplink random access channel of at least one neighboring cell of the at least one transmission network element.

According to further refinements, there may be comprised one or more of the following features:
  it may be determined whether a traffic load in a cell of the at least one transmission network element being in an active mode is below a predetermined first threshold, and when the traffic load is below the predetermined first threshold, an instruction may be sent to the at least one transmission network element to change the operation mode to the inactive state, and channel sequence information and information on allowed access time intervals of at least one uplink random access channel of a neighboring cell to be monitored by the at least one transmission network element in the sensor mode for traffic monitoring may be sent to the at least one transmission network element;
  a report of a result of the random access traffic monitoring by the at least one transmission network element in the sensor mode may be received, the received report may be processed for determining whether the traffic load in the cell of the at least one transmission network element is greater than a second predetermined threshold, and when the it is determined that the traffic load in the cell of the at least one transmission network element is greater than the second predetermined threshold, a further instruction may be sent to the at least one transmission network element to change the operation mode from the inactive state to an active state;
  when the instruction to change the operation mode to the inactive state is sent to the at least one transmission network element, an information may be sent to neighboring cells of the at least one transmission network element whose channel sequence information are sent to the at least one transmission network element about the change of the at least one transmission network element into the inactive state;
  at least one of the setting information, the channel sequence information and information on allowed access time intervals may be sent as an attribute parameter of a specific information object class;
  the mechanism may be implemented in at least one of a network entity of a communication network functioning generating a self organized and optimized network, and a management control network element.

Furthermore, according to examples of the proposed solution, there is provided, for example, a computer program product for a computer, comprising software code portions for performing the steps of the above defined methods, when said product is run on the computer. The computer program product may comprise a computer-readable medium on which said software code portions are stored. Furthermore, the computer program product may be directly loadable into the internal memory of the computer and/or transmittable via a network by means of at least one of upload, download and push procedures.

By virtue of the proposed solutions, it is possible to provide a mechanism usable for power saving where UE power consumption can be kept at reasonable level in a communication system while at the same time the network energy needs during off peak hours can be reduced. Simultaneously, system performance is not deteriorated. Thus, it is possible to overcome a problem regarding a decision concerning the reactivation of the inactive transmission node, irrespective of whether the decision is done in the OAM functionality or by the inactive node autonomously, that the inactive transmission node can not assess local traffic requirements or load in its neighbourhood and the overlap areas. Instead, it is possible to obtain important information which is useful for the making the decision when to switch to the active state again. Hence, a more frequent and aggressive switch off procedure based on short term SOON load balancing strategies is possible, allowing an improved energy saving performance.

By providing a mechanism which allows a transmission node located in a communication network system, in particular in a co-channel heterogeneous network system, to operate in a sensor mode (or monitor mode) it is possible to check for a transmission node being inactive or "sleeping" (inactive or sleeping means that still parts of the transmission node are activated and can listen to incoming signalling, that is that e.g. from standards perspective reception of requesting for wake up via a non-wireless interface still works) whether the current load situation requires a reactivation of the inactive transmission node. Thereby power consumption in UEs and the network nodes can be reduced while a potential disadvantage of quasi static energy saving strategies, such as a degradation of service quality in unforeseen traffic situations, can be avoided or diminished. This is in particular useful in network procedures or communication systems having a heterogeneous network structure deployed, such as in 3GPP LTE mobile wireless communication networks when heterogeneous access nodes like relays and low power nodes (e.g. hotspots, pico, femto nodes or "Home NBs") are deployed in co-channel mode.

Furthermore, based on the procedures according to examples of the present invention, it is possible to optimize inter node co-channel energy saving procedures, considering the typical coverage overlap areas and redundancy that can be utilized in case of low capacity needs to trade off against efficient UE battery consumption and network energy saving without harming the overall system performance.

Moreover, the principles of the present invention are usable in network structures having a high degree of self organization capability, i.e. where the network nodes like transmission nodes are able to self-organize network procedures related to activation/reactivation of nodes for energy saving purposes and system performance issues, and also in network structures where a more centralized control of energy saving and system performance is established.

The above and still further objects, features and advantages of the invention will become more apparent upon referring to the description and the accompanying drawings.

BRIEF DESCRIPTION OF THE DRAWINGS

FIGS. 1a and 1b show diagrams illustrating an example of a heterogeneous network deployment scenario, wherein FIG. 1a shows a deployment and cell coverage illustration of access or transmission nodes and FIG. 1b shows a neighbor graph of the access or transmission nodes according to FIG. 1a.

DESCRIPTION OF PREFERRED EMBODIMENTS

Figure 1A:
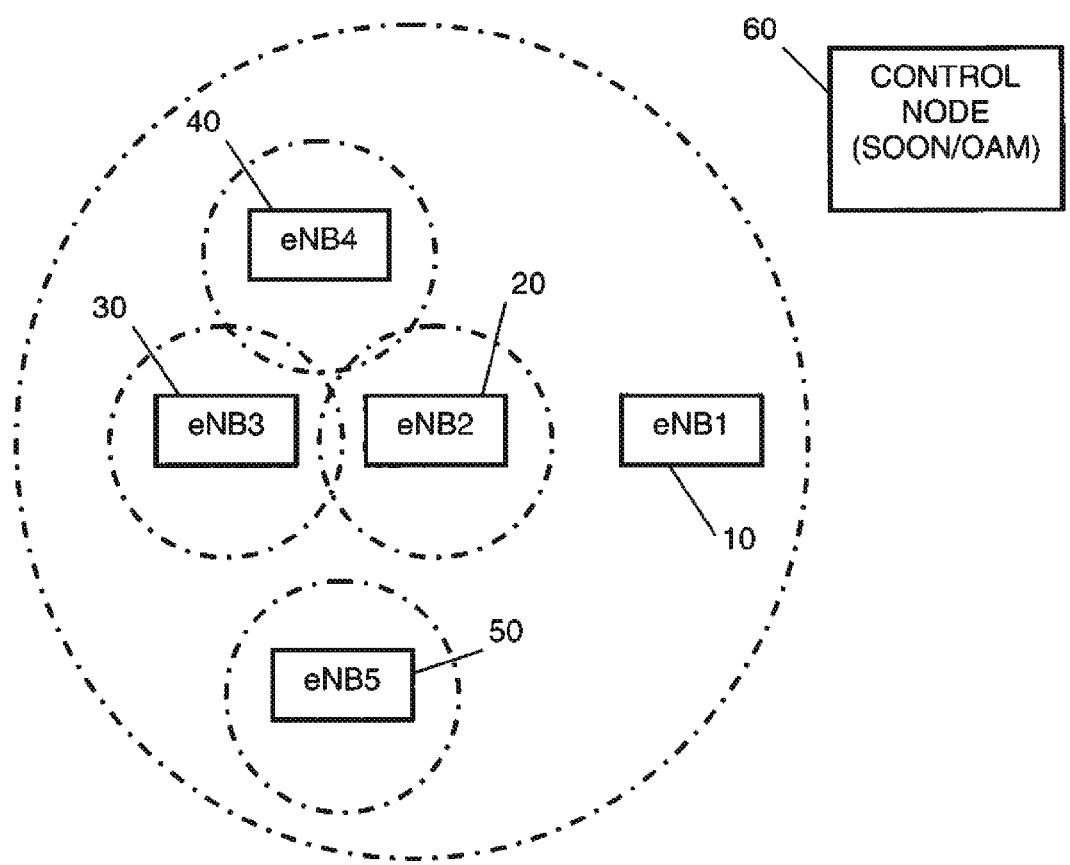

In the following, examples and embodiments of the present invention are described with reference to the drawings. For illustrating the present invention, the examples and embodiments will be described in connection with a communication system which may be based on a 3GPP LTE-advanced system where one or more transmission nodes are used in a heterogeneous network structure with correspondingly interrelated cells. However, it is to be noted that the present invention is not limited to an application in such a system or environment but is also applicable in other communication systems, connection types and the like.

A basic system architecture of a communication network may comprise a commonly known architecture comprising a wired or wireless access network subsystem and a core network. Such an architecture comprises one or more access network control units, radio access network elements, access service network gateways or base transceiver stations, with which a UE is capable to communicate via one or more channels for transmitting several types of data. Furthermore, core network elements such as gateway network elements, authentication/authorization/accounting network elements, home subscriber system network elements, policy and charging control network elements and the like are usually comprised. The general functions and interconnections of these elements are known to those skilled in the art and described in corresponding specifications so that a detailed description thereof is omitted herein. However, it is to be noted that several additional network elements and signaling links may be employed for a communication connection or a call between UEs and/or servers than those described in detail herein below.

Furthermore, the described network elements, such as trans-mission nodes like base stations, eNBs etc., network control nodes like SOON entities or OAM entities, UEs and the like, as well as corresponding functions as described herein may be implemented by software, e.g. by a computer program product for a computer, and/or by hardware. In any case, for executing their respective functions, correspondingly used devices and network element may comprise several means and components (not shown) which are required for control, processing and communication/signaling functionality. Such means may comprise, for example, a processor unit for executing instructions, programs and for processing data, memory means for storing instructions, programs and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit (e.g. wired and wireless interface means, an antenna, etc.) and the like.

Figure 1B:
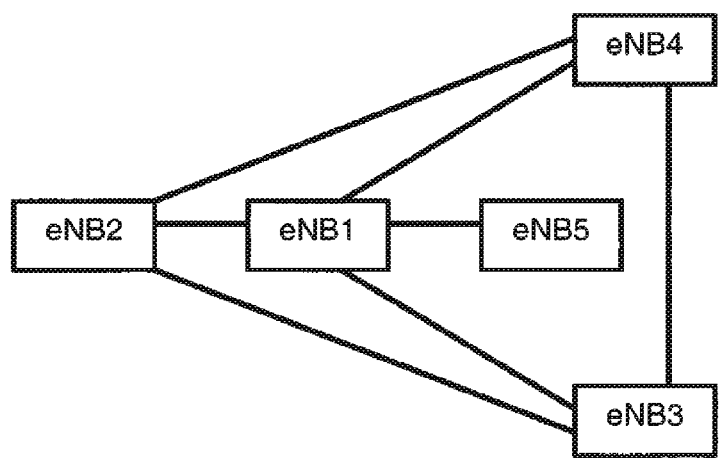

In FIGS. 1a/b, a simplified architecture of an exemplary communication network is shown where examples of embodiments of the invention are implementable. Specifically, FIG. 1a shows a deployment scenario according to 3GPP LTE principles where a RAN having several access points (referred to hereinafter also as transmission nodes) are arranged in a co-channel heterogeneous deployment. FIG. 1b shows a neighbor graph where the neighbor relations (i.e. cell overlap) of the transmission nodes according to FIG. 1a are illustrated.

It is to be noted that the network architecture shown in FIG. 1a depicts only those network elements which are useful for understanding the principles of the examples of embodiments of the invention. As known by those skilled in the art there are several other network elements involved in the establishment, control and management of a communication connection which are omitted here for the sake of simplicity.

Referring to FIG. 1a, reference sign 10 denotes a first transmission node such as base station like an eNB (here eNB1) which may represent, for example, an access node controlling a coverage area or cell (like a macro cell or the like) which is indicated by the dashed circle surrounding the transmission nodes shown in FIG. 1a. Reference signs 20, 30, 40 and 50 denote a respective other transmission node, such as eNB2, eNB3, eNB4, and eNB5, which are each controlling an own cell (indicated by a dashed circle surrounding the respective transmission node). One or more of the eNB2, eNB3, eNB4, and eNB5 may be, for example, access nodes for hotspots, pico or femto cells, or may be regular eNBs comparable to the eNB1.

It is to be noted that the eNBs 10 to 50 shown in FIG. 1a may be interconnected to each other by corresponding links or interfaces, such as X2 interfaces according to 3GPP LTE.

Reference sign 60 denotes a control element or node which performs operations required in the power saving procedures according to examples of embodiments of the invention. For example, the control element 60 may be a management control network element like an OAM entity used for operation, administration and management functions, or a SOON entity used for controlling a self-organization and optimization of the network shown in FIG. 1a. The control element 60 may be configured to perform both of the SOON and OAM functionalities, or only one of them, for some or all of the eNB1 to eNB5. Furthermore, the control element may be a separate network element like a gateway node or the like connected to the transmission nodes eNB1 to eNB 5 via a corresponding link, or may be part of one of the transmission nodes (for example a "main" transmission node like eNB1 10 when it controls a overlaying macro cell or the like).

The neighbor relation between the transmission nodes eNB1 10, eNB2 20, eNB3 30, eNB4 40, and eNB5 50 is illustrated in the diagram according to FIG. 1b. As shown therein, since in the coverage area of the eNB1 10 the cells of eNB2 20, eNB3 30, eNB4 40, and eNB5 are located, eNB1 10 is neighbor of eNB2 20, eNB3 30, eNB4 40 and eNB5 50. Furthermore, since the coverage area of eNB2 20 overlaps with those of eNB3 30 and eNB4 40, eNB2 20 is neighbor of eNB3 30 and eNB4 40. In the same way, since the coverage area of eNB3 30 overlaps also with that of eNB4 40, eNB3 30 is neighbor of eNB4 40.

One aspect of examples of embodiments of the invention, when being implemented for example in a co-channel heterogeneous network deployment as that shown in FIGS. 1a and 1b, is to keep the number of active access nodes, i.e. eNB1 10, eNB2 20, eNB3 30, eNB4 40, and eNB5 50 as low as possible, in order achieve a reasonable UE battery consumption during idle mode and to minimize energy consumption in the network.

For example, in off peak network hours with less traffic, it is a goal of examples of embodiments of the invention that only those access nodes are active (i.e. send signals causing energy consumption in UEs due to the processing indicated above) which are necessary to provide a sufficient network capacity under the current (low) load. Another goal of examples of embodiments of the invention is to increase the controllability and flexibility of the network to react e.g. to a changing load situation, i.e. when for example an unexpected traffic increase occurs, examples of embodiments of the invention provides an energy saving strategy where transmission nodes which are inactive due to the energy saving procedure are transferred into a sensor mode or monitor mode where the inactive nodes measure specific information related to the traffic situation in the network and which is thus useful for example for SOON considerations or the like, especially for quickly reactivating inactive nodes in an appropriate way.

For this purpose, the transmission nodes switching into the inactive mode are provided with specific information, such as random access channel sequence information and information on allowed access time intervals of neighboring nodes allowing a detection of information related to a traffic which would also be of relevance for the inactive transmission node if it were active (i.e. an indication whether a traffic situation may change to a state where a reactivation would be necessary/useful). Specifically, the inactive nodes being switched to the sensor mode can detect load related information and collect statistics as a background task. The information collected can be also used, for example, to improve a decision procedure in the inactive node to autonomously switch to the active state or a decision procedure of an OAM or SOON functionality to reactivate the corresponding transmission node.

The setting of a transmission node to enter the sensor mode when switching to the inactive state may be done by providing the respective transmission node with specific setting information or instructions which informs the transmission node that it is selected or dedicated as becoming a sensor node, i.e. that it has to enter the sensor mode when switching to the inactive state. The setting information may be provided, for example, by the control node 60, i.e. the OAM or SOON entity. Furthermore, the setting to be a sensor node may be temporarily or (semi-)permanently. That means that the respective transmission nodes may be selected as being always a sensor node which may be decided at an early state. In this case, corresponding setting information may be sent to the transmission node, for example, in the network deployment phase. Otherwise, the respective transmission nodes may be selected as temporary sensor nodes e.g. when the load situation determined by an OAM or SOON entity is such that a switching of transmission nodes at specific part(s) of the network to an inactive state is deemed to be useful. In this case, corresponding setting information may be sent to the respective transmission node when required, i.e. shortly before a switching to an inactive state becomes likely or is executed. It is to be noted that a network may comprise also a temporarily or (semi-)permanently set of sensor nodes. Furthermore, it is to be noted that a transmission node may be informed also during the inactive mode, i.e. the sensor mode may be also instructed (and thus started) when the inactive state is already entered by a transmission node for some time.

As an example for a format of the setting information, the control node 60 may send specific attribute information, for example of a predetermined IOC (described later in further detail). Such an attribute may be identified, for example, as rachMonitoringDuringES when a channel to be monitored during sensor mode is a RACH of neighboring cells. This attribute may be used to determine if a cell shall monitor RACH sequences when some or all of its active radio transmission units are inactive for energy saving purposes. The value of this attribute can be changed before, during or after the cell being in an energy saving state, and may be as an example monitoringOn (for indicating that the corresponding node shall enter the sensor mode when being inactive) or monitoringOff (for indicating that the corresponding node shall not enter the sensor mode when being inactive).

In the following, a first example of embodiments of the invention is described with reference to FIGS. 2 to 5. The first example of embodiments of the invention can also be summarized as a procedure for autonomously deciding in the transmission node regarding deactivation/reactivation, wherein it is thus in particular useful in a SOON system.

For explaining the principles of the first example of embodiments of the invention it is assumed that in a network structure as depicted in FIGS. 1a and 1b the traffic is such low that for example eNB2 20 makes the decision to enter inactive state.

Conventionally, eNB2 20 informs the neighboring transmission nodes eNB1 10, eNB3 30 and eNB4 40 after the decision is made. Then eNB2 20 is inactive and stops transmission of all downlink signals. Furthermore, a reactivation of the eNB2 20 can be done by eNB2 20 itself (autonomous decision), by the OAM functionality, e.g. control node 60, or by a request from the neighbors eNB1 10, eNB3 30 or eNB4 40. It is to be noted that if a neighbor transmission node (eNB1 10, eNB3 30 or eNB4 40) requests reactivation of eNB2 20, it is not mandatory for eNB2 20 to follow the received request. However, in case the request is followed, a corresponding response signaling is done.

As indicated above, according to the examples of embodiments of the invention, one or more of the transmission nodes in the co-channel heterogeneous network as depicted in FIG. 1a/b may be set to enter the sensor mode when being switched to the inactive state. In the scenario indicated above, i.e. where the eNB2 20 decides to enter the inactive state, this means that this transmission node is used as a receiver or sensor e.g. for SOON purpose. Thus, it is possible to overcome a problem regarding a decision concerning the reactivation of the inactive transmission node, irrespective of whether the decision is done in the OAM functionality or by the eNB2 20 autonomously, that the inactive transmission node can not assess local traffic requirements or load in its neighbourhood and the overlap areas (i.e. eNB1 ∩ eNB2, eNB3 ∩ eNB2 and eNB4 ∩ eNB2). That is, according to examples of embodiments of the invention, important information can be obtained which is useful for the decision when to switch to the active state again. Hence, a more frequent and "aggressive" switch off procedure based on short term SOON load balancing strategies is possible.

Figure 2:
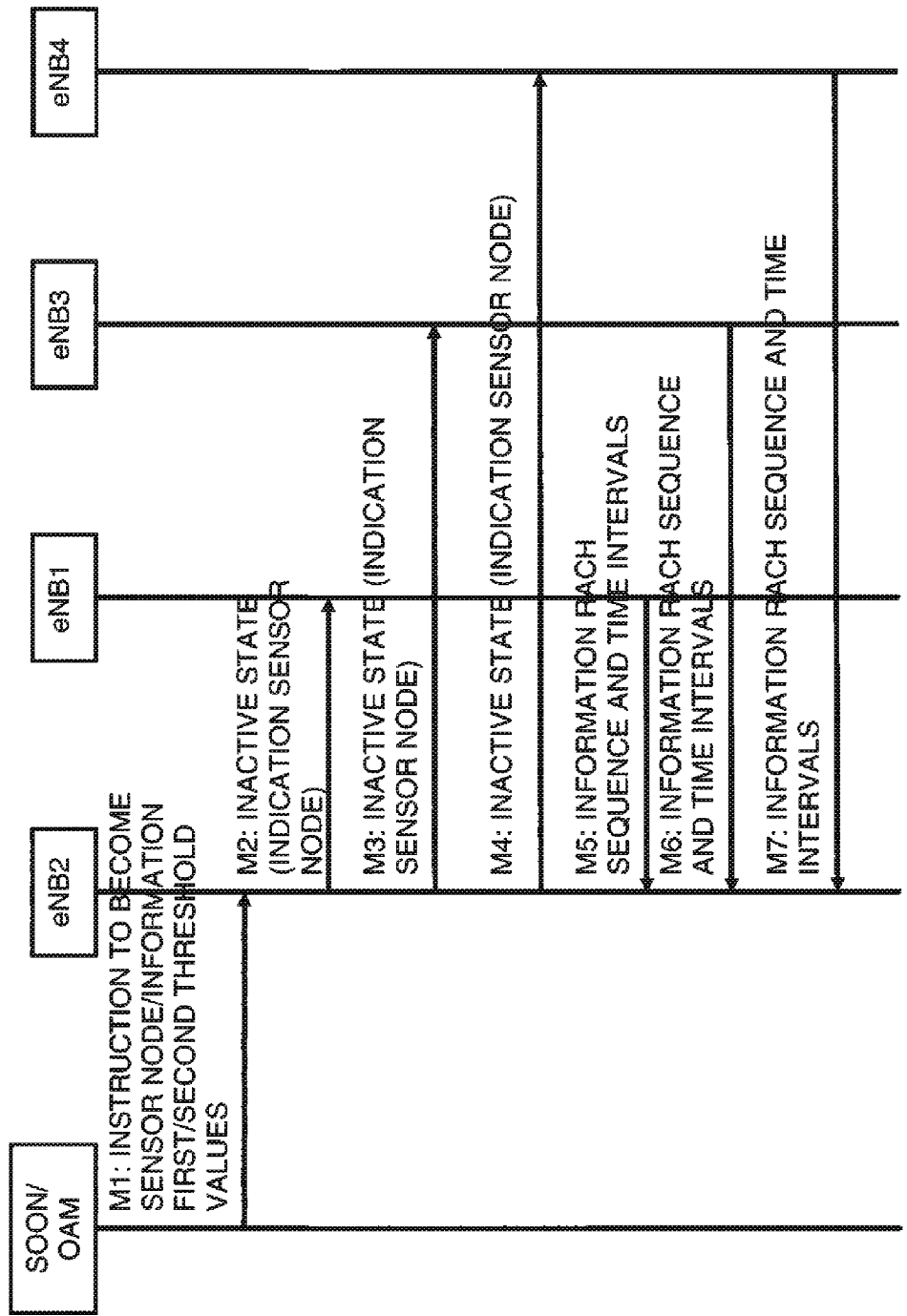
FIG. 2 shows a signaling diagram illustrating a signaling in a communication network when a transmission node is inactivated according to a first example of embodiments of the invention.
Figure 3:
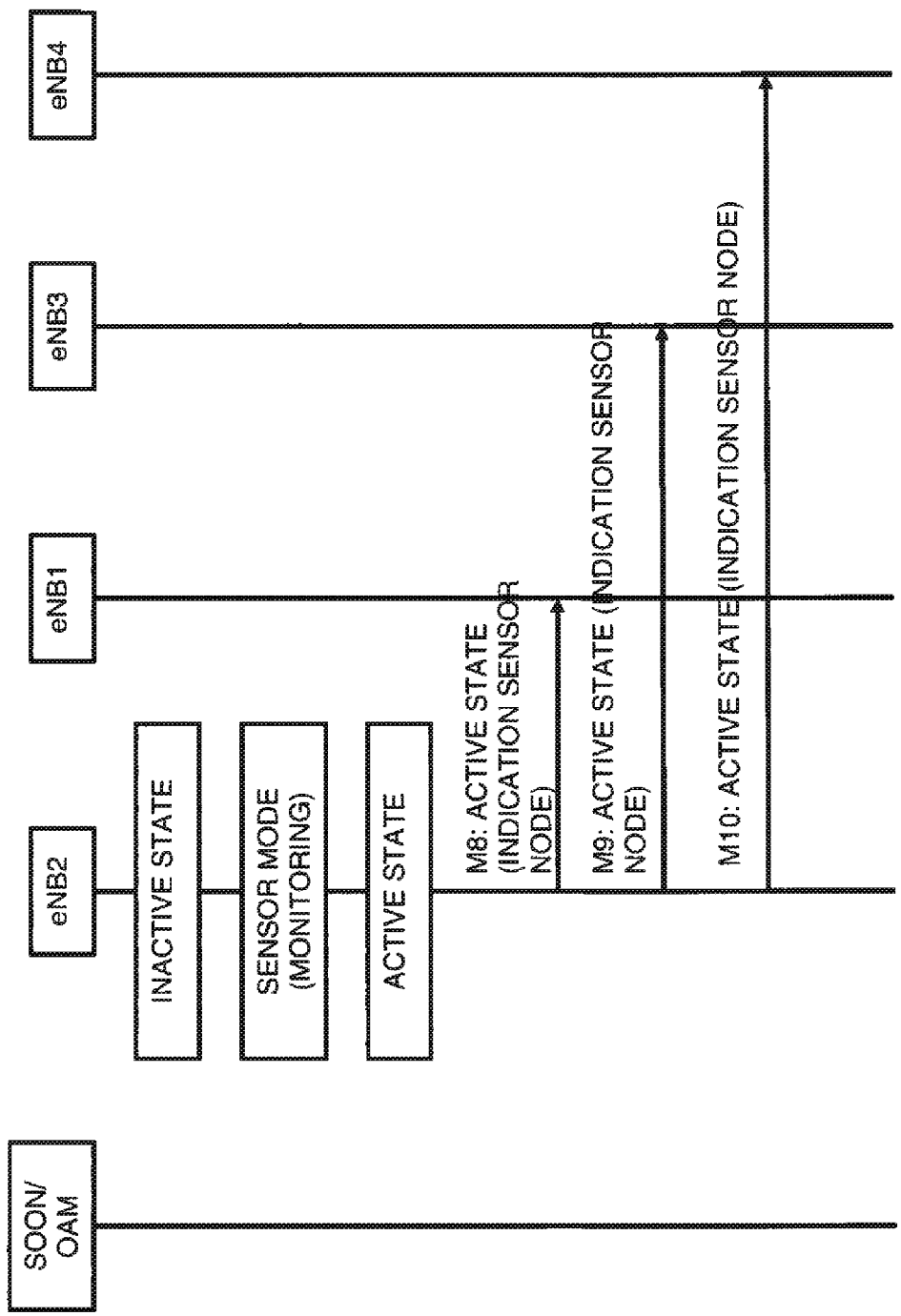
FIG. 3 shows a signaling diagram illustrating a signaling in a communication network when a transmission node is reactivated according to the first example of embodiments of the invention.
Figure 4:
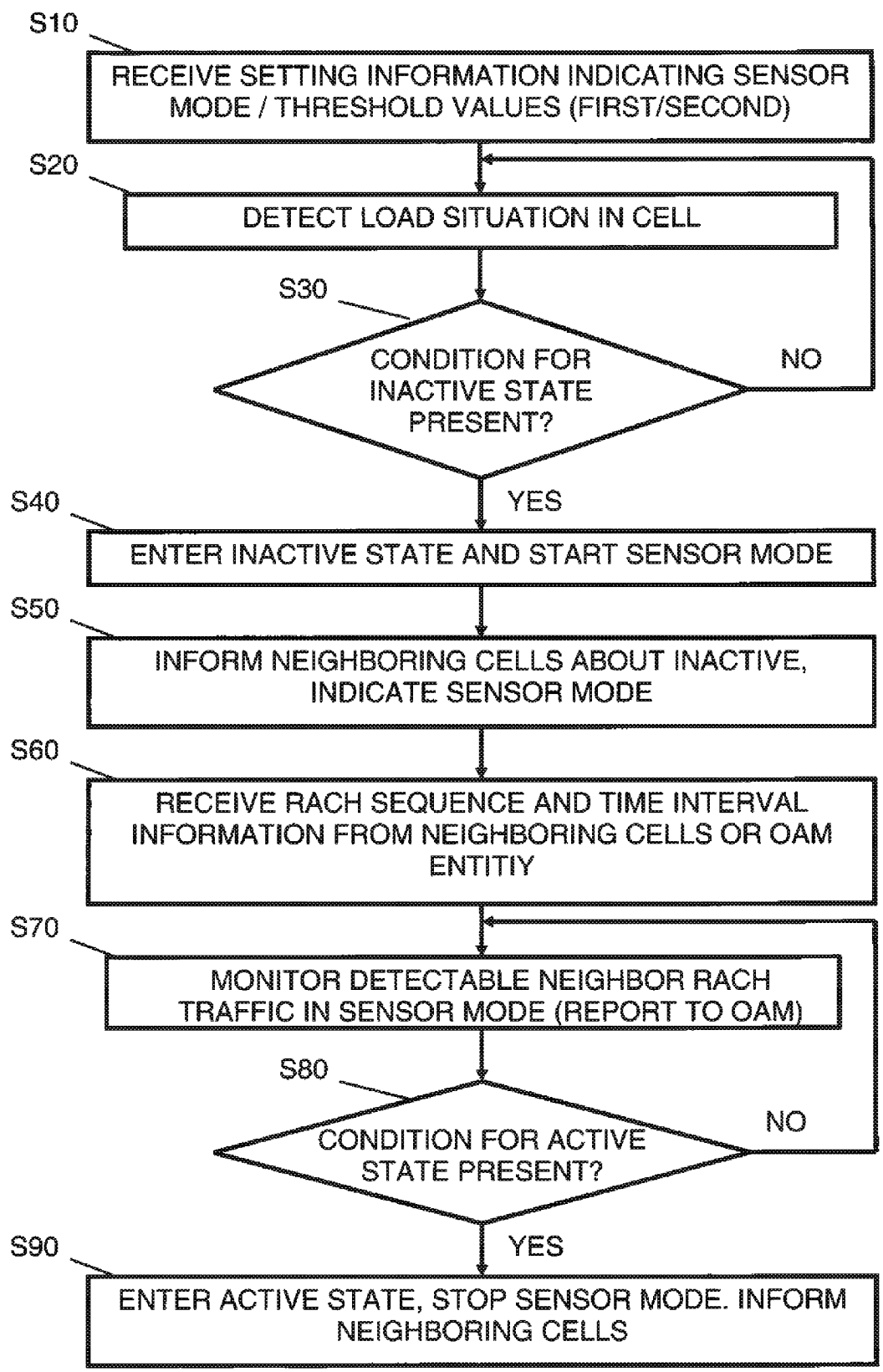
FIG. 4 shows a flowchart showing a control procedure executed in a transmission node according to the first example of embodiments of the invention.

According to the first example of embodiments of the invention, the decision regarding switching into the inactive state and the active state is done by the transmission node (in the present example the eNB2 20) autonomously. FIG. 4 shows a flowchart showing a corresponding control procedure executed in the eNB2 20, while FIG. 2 shows a signaling diagram illustrating the signaling in the network as depicted in FIGS. 1a/b when the eNB2 20 is switched to an inactive state. On the other hand, FIG. 3 shows a signaling diagram illustrating the signaling in the network as depicted in FIGS. 1a/b when the eNB2 20 is switched to an active state again.

Referring to FIG. 4, in step S10, the eNB2 20 receives setting information from a control element, such as OAM/SOON entity 60, which configures the eNB2 20 to be a sensor node, i.e. to enter a sensor mode when switching to an inactive state. Additionally, the eNB2 20 receives in this signaling also an indication regarding threshold values to be considered for the switching to inactive/active state, such as first and second thresholds to be described later. The first and second thresholds may be stored in the control node 60 or determined therein by using a predefined process. The transmission of the respective information is shown in FIG. 2 at message M1.

In step S20, the eNB2 20 detects the load or traffic situation in its own cell when being in active mode, e.g. according to standard procedures. As corresponding measures and procedures for monitoring the cell traffic or load are known to those skilled in the art, a detailed description thereof is omitted here.

In step S30, it is decided whether or not the traffic or load situation which is detected in step S20 is such that the transmission node, i.e. the eNB2 20, can switch to an inactive state due to energy saving reasons, for example. That is, it is determined in step S30 whether a switch condition for entering the inactive state is present. For example, the condition is met when the load or traffic in the own cell is below a predetermined threshold (also referred to as first threshold), or the like, which may be received in step S10.

If the decision in step S30 is negative, the load/traffic detection in the own cell is continued, i.e. the process returns to step S20.

Otherwise, in case the condition for switching to the inactive state is met in step S30 (YES), the eNB2 20 decides to enter the inactive step, and step S40 is executed. In step S40, the eNB2 20 switches to the inactive state as defined above (i.e., for example, it turns down DL signaling and the like) and enters, as the setting information in step S10 has been received, to the sensor mode. In other words, the transmission node (here eNB2 20) is configured to be utilized during the inactive state as a sensor node, for example for SOON purposes, and may measure specific information, such as uplink statistics like load balancing statistics by detecting UE random access channels (such as RACH according to LTE) intended for neighbor nodes which can be received by the transmission/sensor node, and/or interference statistics by detecting UL interference (IoT) at the sensor node.

When deciding to switch to the inactive state, the eNB2 20 informs in step S50 its neighbor cells (i.e. transmission nodes according to e.g. the neighbor relation diagram according to FIG. 1b) about the decision before the inactive state is entered. Since the eNB2 20 is configured to become a sensor node in the inactive state, it includes also an indication in the notifying message informing about the sensor node configuration. A corresponding signaling is depicted in FIG. 2 at messages M2, M3 and M4, where the respective neighboring transmission nodes eNB1 10, eNB3 30 and eNB4 40 are informed by the eNB2 20 (as an alternative some or all of the neighboring nodes may be also informed by the OAM entity (control node 60) by means of a signaling having a comparable meaning like that of messages M2 to M4; this is not shown in the figure).

In the neighboring transmission nodes eNB1 10, eNB3 30 and eNB4 40 receiving the signaling sent in step S50 (i.e. messages M2, M3, M4 in FIG. 2), the following processing may be conducted according to examples of embodiments of the invention. That is, when receiving, for example, the signaling M2 in eNB1 10, the eNB1 10 processes the indication that the sending node eNB2 20 is entering the inactive state, and determines also that eNB2 20 is a sensor node as described above. In reaction to the determination of the eNB2 20 as being a sensor node, the eNB1 10 responds to the signaling M2 by sending a signaling M5 to the eNB2 20 in which the eNB1 10 provides the eNB2 20 with information to be used for traffic monitoring settings. Specifically, the eNB1 10 may inform the eNB2 20 about one or more channel sequences (RACH sequences) and allowed access time intervals of specific uplink random access channels used in the cell area of eNB1 10. Channels usable for detection, such as random access channels like RACH according to LTE specifications, may be used by UEs or the like to gain access to the communication system via an access point at an initial connection state or the like. It is to be noted that other neighboring transmission nodes receiving a corresponding information from the transmission node entering the sensor mode, such as eNB3, 30 and eNB4 40 in the above described example, process the received message correspondingly and send RACH related information or the like to the eNB2 20 (see FIG. 2, messages M6 and M7).

It is to be noted that the RACH related information or the like may be received alternatively by the eNB2 20 from the OAM entity (control node 60) which may provide the information in a separate signaling (not shown in FIG. 2).

Returning to FIG. 4, when the transmission node entering the inactive state with sensor mode (i.e. the sensor node) eNB2 20 receives the messages from the neighboring cells (i.e. messages M5 to M7 in FIG. 2, for example) (or alternatively from the OAM entity (not shown)), containing the uplink random access channel related information (such as RACH sequences and allowed access time intervals) from the neighboring nodes eNB1 10, eNB3 30 and eNB4 40, for example, (step S60) it determines from the information the target of the traffic monitoring to be conducted in the sensor mode, i.e. uplink random access channels of the neighboring cells with which its own cell has overlapping areas or the like. In other words, the eNB2 20 when being in the sensor mode is able to identify specific signaling from a UE towards a neighboring node which can be also detected/received by itself. Thus, the eNB2 20 is able to allocate, for example, a received UE RACH towards a neighboring cell to a neighbor cell and can thus derive a corresponding load and traffic situation at this cell (i.e. at the cell edges and overlapping coverage areas).

It is to be further noted that in case RACH sequences and/or allowed access time intervals changes in the neighboring nodes eNB1 10, eNB3 30 or eNB4 40, for example, during the eNB2 20 being in the sensor mode, according to examples of embodiments of the invention, the eNB2 20 may be informed about such changes, for example by means of additional messages or signaling indicating such changes (the format of such signaling may be similar to that of messages M5 to M7, for example. If the eNB2 20 receives such information during the sensor mode, it is configured according to examples of embodiments of the invention to change also corresponding settings for the sensor mode, i.e. to detect the traffic at the respective neighboring cell on the basis of the thus updated information.

After the required information for conducting the sensor mode are received in step S60, the eNB2 20 may enter the inactive state with sensor mode (i.e. become a sensor node) and start the traffic monitoring on the RACHs indicated by the neighboring cells.

According to examples of embodiments of the invention, any sensor node, such as the eNB2 20, may signal results of the traffic monitoring to a control entity, such as the control node 60. Specifically, the eNB2 20 being in the sensor mode may process the monitoring results and signal SOON statistics to an OAM system or SOON entity (represented by the control node 60, for example) periodically or after a request from the control node or triggered by events. Corresponding mechanisms, like notifications or performance measurements, are defined by several standards and thus known to those skilled in the art.

It is to be noted that it may also be possible to deactivate or cancel the setting of a transmission node (e.g. eNB2 20) to be or to become a sensor node. That is, the eNB2 20 may be reset or the like, i.e. it is not configured to conduct the measurements with its receiver during the inactive state (configuration as a sensor node is OFF, for example). This may be done, for example, by means of deactivating a corresponding setting information like an attribute or the like is set to be deactivated. In this case, the above described procedure ends after signaling the entering in the inactive state according to messages M2 to M4 in FIG. 2 (without the indication of being a sensor node), and the eNB2 20 can enter the inactive state.

When being in the sensor mode in step S70, the eNB2 20 monitors for example the detectable RACH traffic in the neighboring cells of eNB1 10, eNB3 30, and eNB4 40. That is, while in the sensor mode the TX path of the eNB2 20 may be inactive or switched off, the RX path of the eNB2 20 still monitors the RACH traffic in the neighboring areas (cell edge, overlapping areas) and in its previously "own" area (for example on the basis of previously valid settings for parameters like RACH sequences and allowed access time intervals), i.e. RACH traffic which could also be answered by the eNB2 20 in theory.

According to the present example of embodiments of the invention, as the deactivation/reactivation decision may be done autonomously by the inactive transmission node itself, in step S80, the eNB2 20 determines whether a condition for entering (again) the active state is present or not. For example, the eNB2 20 may determine on the basis of the results of the traffic monitoring done in step S70 whether the RACH traffic (which is directed to the other cells and is monitored on the basis of the information received in step S60, for example) meets a pre-defined criteria, e.g. exceeds a second predetermined threshold (which may be received, for example, in step S10). The second predetermined threshold may be the same as the first threshold used in step S30, or may be different to that (greater or less), and depend on the network configuration or operator setting, for example. In other words, by means of the monitoring conducted in step S70, the eNB2 20 is able to determine the traffic or number of received RACH signals per time interval which could be also handled by the eNB2 20 itself (i.e. the inactive transmission node) when it would be active. Thus, this result is usable as an indicator for a decision regarding reactivation.

If the decision in step S80 is negative, the traffic monitoring is continued (i.e. the sensor mode is maintained), and the process returns to step S70.

Otherwise, in case the condition for switching to the active state is met in step S80 (YES), the eNB2 20 decides to enter the active state, and step S90 is executed.

In step S90, the eNB2 20 switches to the active state (i.e., for example, it turns on DL signaling, TX paths etc., i.e. becomes fully operational again) and stops the sensor mode (i.e. stops monitoring of RACH traffic of the neighboring cells). Furthermore, the neighboring cells, i.e. eNB1 10, eNB3 30 and eNB4 40 may be informed about the entering of the active state by the eNB2 20 or by the OAM entity (control node 60).

It is to be noted that switching to the active state of the eNB2 20 may be also conducted in case a corresponding request by one of the neighboring transmission nodes is received, or due to a decision based on another reason (timer expiry or the like) of the inactive transmission node, or when a corresponding trigger or switch on instruction is received from a control node. Also in these cases the neighboring nodes may be informed about the reentering of the active state. Furthermore, in case the reactivation request is received from another (neighboring or control) node, the requesting node may also be informed about the decision of the inactive node regarding reactivation or maintenance of the sensor mode (inactive state), for example in case it is not mandatory for the inactive transmission node to follow the request.

It is to be further noted that after the transmission node, here the eNB2 20, is again in the active state, it uses the RACH sequences and access time intervals used prior to the inactive state, i.e. not the sequences and intervals indicated by the neighboring nodes used during the sensor mode operation.

FIG. 3 shows an example for a signaling conducted in the communication network according to FIG. 1a when steps S70 to S90 according to FIG. 4 are conducted by a transmission node such as eNB2 20. Specifically, as shown in FIG. 3, when the eNB2 20 being in the inactive state and conducting the traffic monitoring in the sensor mode decides to enter the active state (e.g. due to the positive decision in step S80), it may inform the neighboring cells (i.e. eNB1 10, eNB3 30, eNB4 40) with messages M8, M9 and M10, respectively, about the entering of the active state. These messages M8 to M10 may also comprise the indication that the sending node eNB2 20 was set to be a sensor node.

Figure 5:
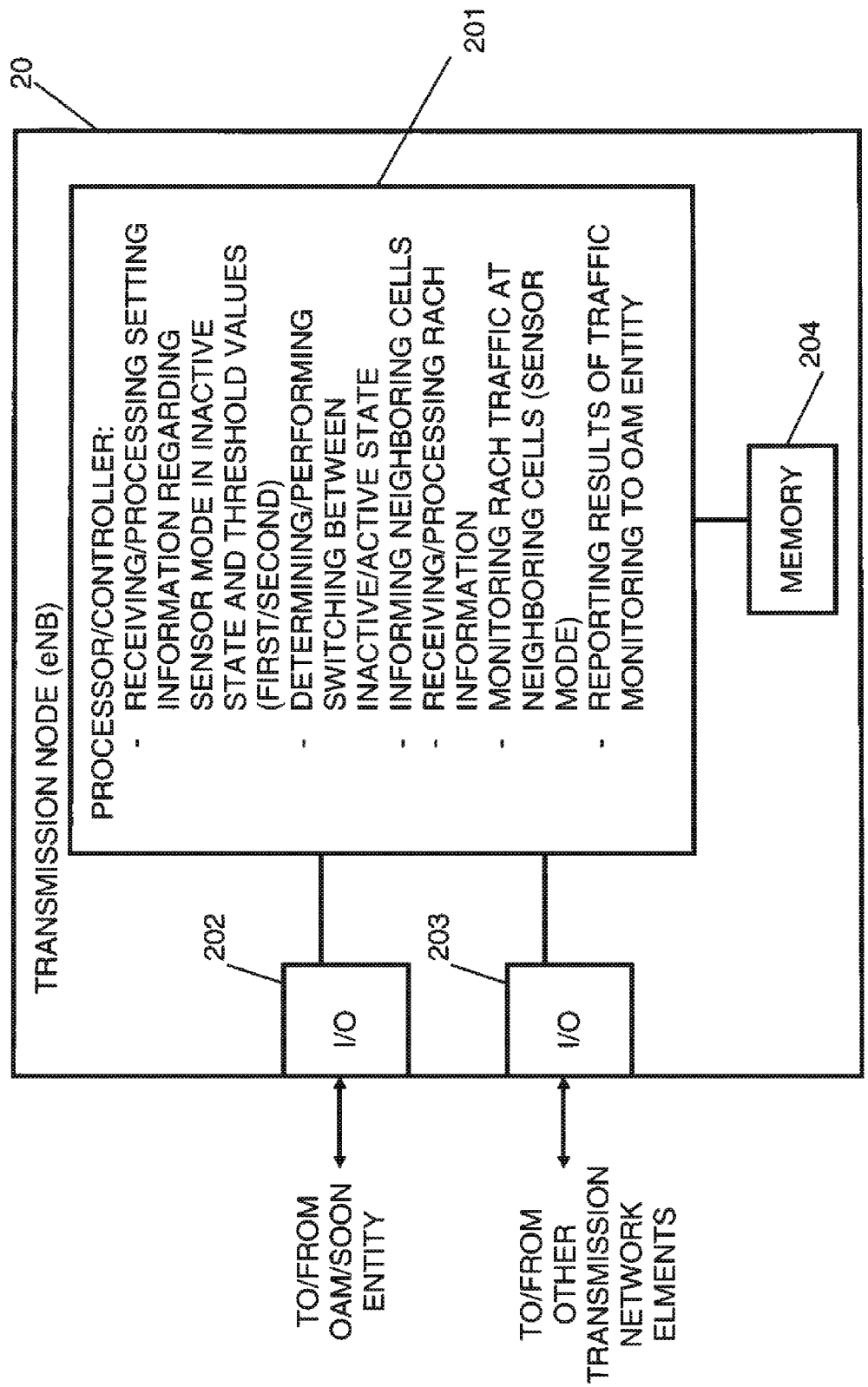
FIG. 5 shows a block circuit diagram illustrating a configuration of a transmission node according to the first example of embodiments of the invention.

In FIG. 5, a block circuit diagram of a network node such as a transmission node eNB (e.g. eNB2 20) is shown which is configured to implement the processing as described in connection with FIG. 4. It is to be noted that the eNB2 20 shown in FIG. 5 may comprise several further elements or functions besides those described in connection therewith but which are omitted herein for the sake of simplicity as they are not essential for understanding the invention.

The eNB2 20 may comprise a processing function or processor 201, such as a CPU or the like, which executes instructions given by programs or the like related to the power saving control. The processor 201 may comprise further portions dedicated to specific processings described below. Portions for executing such specific processings may be also provided as discrete elements or within one or more further processors, for example. Reference signs 202 and 203 denote transceiver or input/output (I/O) units connected to the processor 201. The I/O unit 202 may be used for communicating with a control node, such as a OAM or SOON entity (like control node 60). The I/O unit 203 may be used for communicating with other transmission nodes via corresponding interfaces, such as an X2 interface towards other eNBs. The I/O units 202 and 203 may be a combined unit comprising the communication equipment towards all network elements in question, or may comprise a distributed structure with a plurality of different interfaces. Reference sign 204 denotes a memory usable, for example, for storing data and programs to be executed by the processor 201 and/or as a working storage of the processor 201.

The processor 201 is configured to execute processings related to the deactivation/reactivation of the eNB2 20 according to examples of embodiments of the invention, i.e. for setting/entering the sensor mode and for activating the eNB2 20 when required/requested, as described above. For example, the processor 201 is configured to receive/process the setting information (e.g. sent from the control node 60) regarding conducting the sensor mode when being in an inactive state and information related to the threshold values used for the decision regarding deactivation/activation, to determine and perform the switching between the inactive state with sensor mode and the active state, to inform the neighboring nodes about the state currently entered (active/inactive), to receive and process RACH information related to the neighboring nodes to be used in the traffic monitoring during the sensor mode, to conduct the actual monitoring of the RACH traffic at the neighboring cells (sensor mode), and to report results of the traffic monitoring to a predetermined destination, such as the control node 60 as a SOON or OAM entity.

Next, a second example of embodiments of the invention is described with reference to FIGS. 6 to 9. The second example of embodiments of the invention can also be summarized as a procedure for making a centralized decision in a control node, such as a OAM entity or the like, regarding deactivation/reactivation of one or more transmission nodes and the setting thereof in the sensor mode. For example, in the second example of embodiments of the invention the targets for traffic monitoring, such as RACH sequences, to be conducted by an inactive transmission node in sensor mode are configured via the OAM entity.

For explaining the principles of the second example of embodiments of the invention it is assumed that in a network structure as depicted in FIGS. 1a and 1b the traffic is such low that for example control node 60 decides that at least a part of the network may enter an inactive state, for example the cell associated to the eNB2 20.

As indicated above, according to examples of embodiments of the invention, it is also possible that one or more of the transmission nodes in the co-channel heterogeneous network as depicted in FIG. 1a/b may be set to enter the sensor mode when being switched to the inactive state. In the scenario indicated above, eNB2 20 shall be used as a receiver or sensor. Similar to the above described examples, according to the present second example of embodiments of the invention, important information can be obtained which is useful for the decision when to switch the inactive eNB2 20 back to the active state again. Hence, a more frequent and "aggressive" switch off procedure based on short term SOON load balancing strategies is possible.

Figure 6:
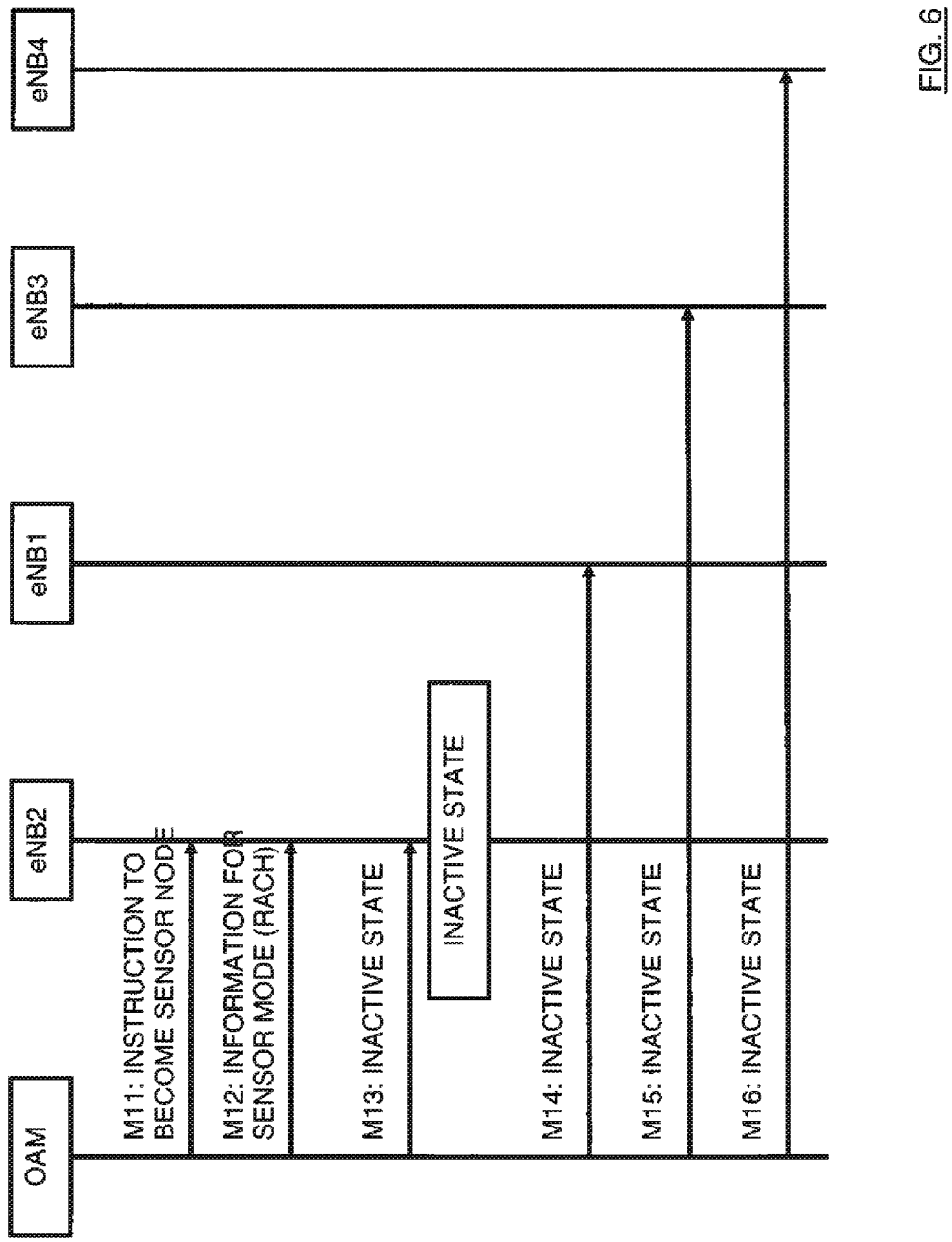
FIG. 6 shows a signaling diagram illustrating a signaling in a communication network when a transmission node is inactivated according to a second example of embodiments of the invention.
Figure 7:
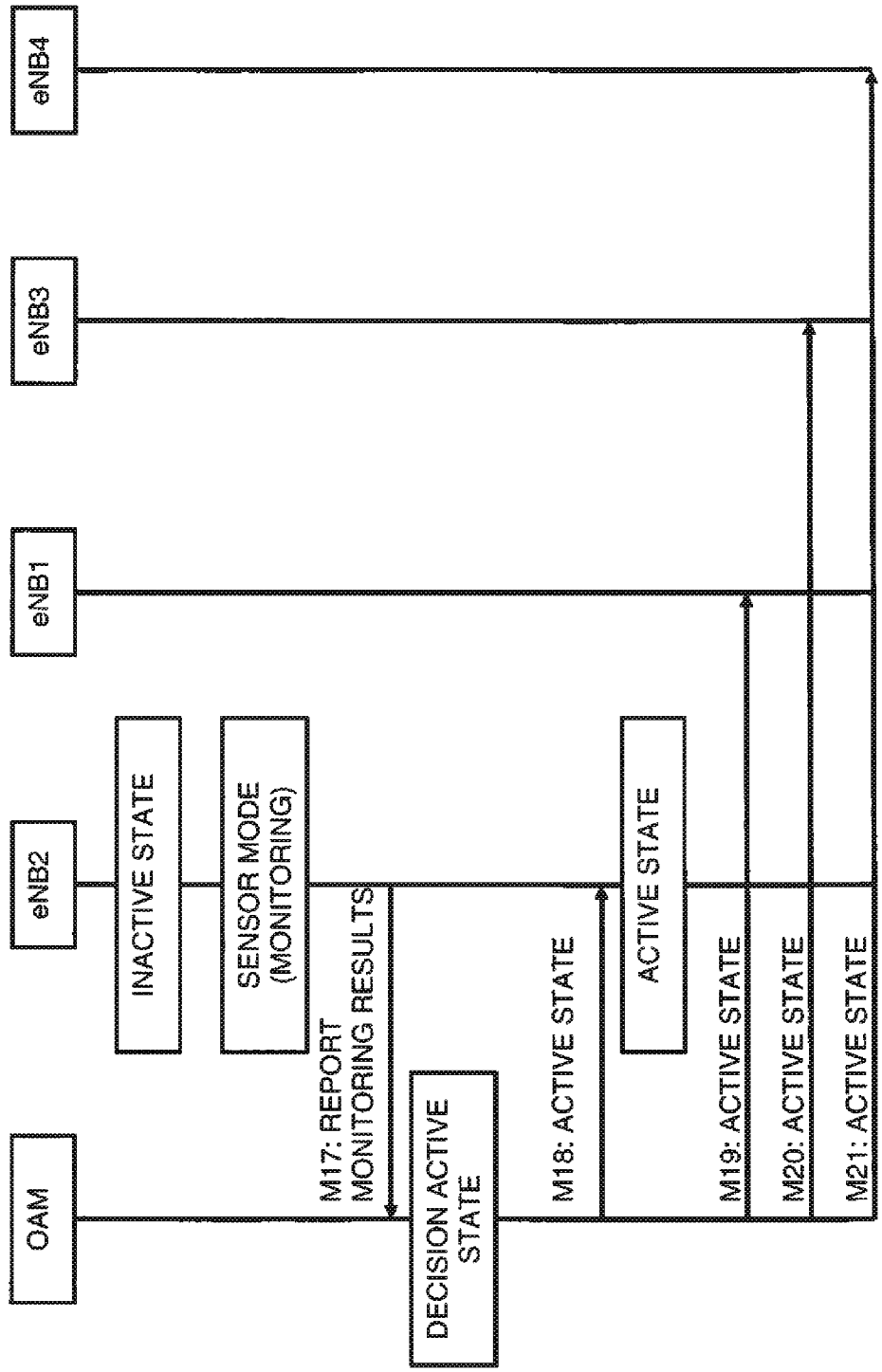
FIG. 7 shows a signaling diagram illustrating a signaling in a communication network when a transmission node is reactivated according to the second example of embodiments of the invention.
Figure 8:
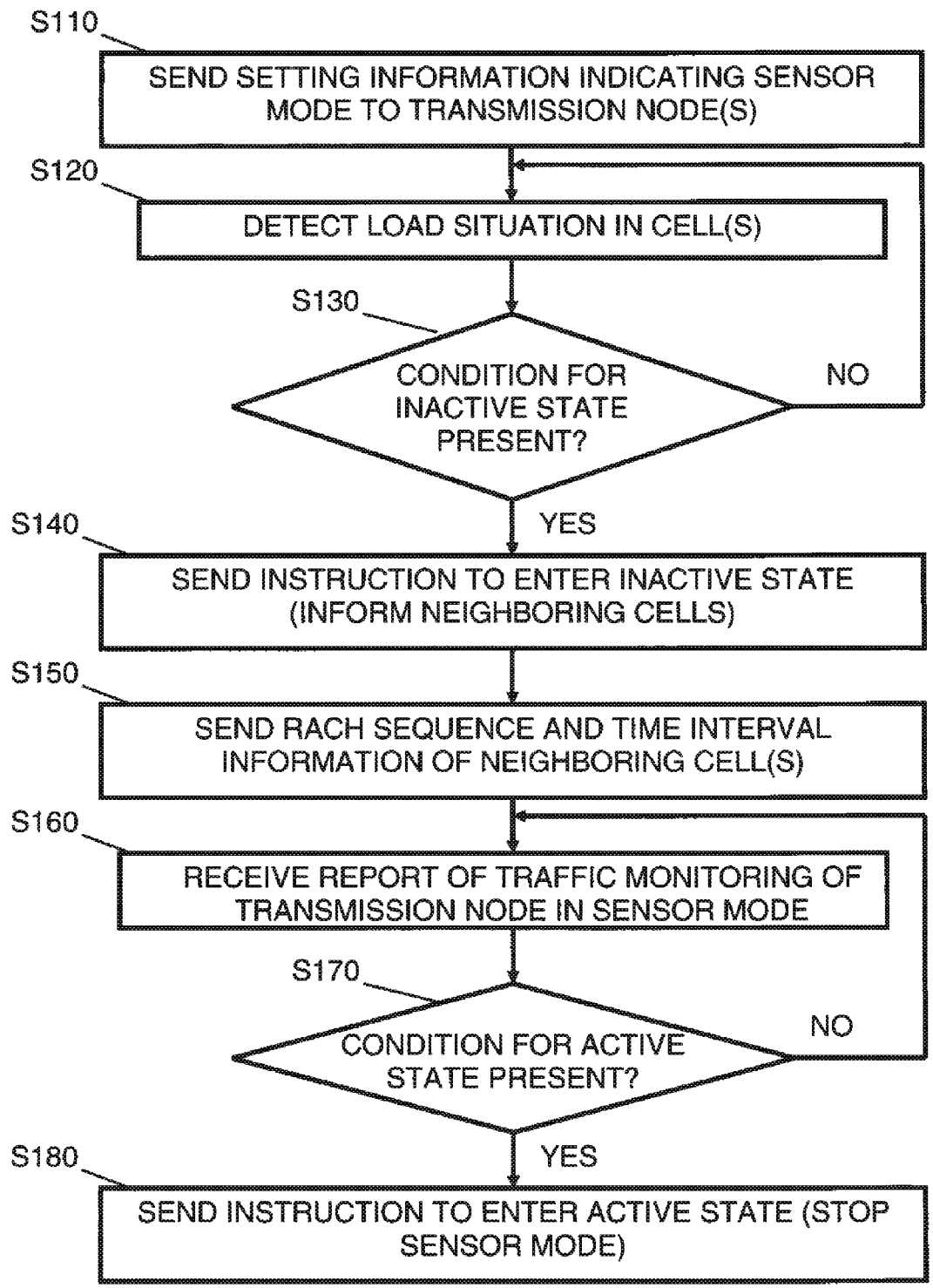
FIG. 8 shows a flowchart showing a control procedure executed in a management control network node according to the second example of embodiments of the invention.

According to the second example of embodiments of the invention, the decision regarding switching into the inactive state and the active state may be done in a centralized manner. FIG. 8 shows a flowchart showing a corresponding control procedure executed in the control node 60 representing an example for such a central decision entity. FIG. 6 shows a signaling diagram illustrating the signaling in the network as depicted in FIGS. 1a/b when the control node 60 decides to switch the eNB2 20 to an inactive state. On the other hand, FIG. 7 shows a signaling diagram illustrating the signaling in the network as depicted in FIGS. 1a/b when the eNB2 20 is switched to an active state.

Referring to FIG. 8, in step S110, the control node 60 sends to the eNB2 20 (and also possibly to other transmission nodes) setting information or instruction which configures the eNB2 20 to be a sensor node, i.e. to enter a sensor mode when switching to an inactive state. This transmission is shown in FIG. 6 at message M11.

In step S120, the control node determines the load or traffic situation in cells associated with the control node, in particular in the cells of active transmission nodes which are set to become a sensor node (see step S110). The determination of the corresponding load or traffic situation may be executed in accordance with standard procedures, and corresponding measures and procedures for monitoring cell traffic or load are known to those skilled in the art, so that a detailed description thereof is omitted here.

In step S130, it is decided whether or not the traffic or load situation which is determined in step S120 is such that a transmission node, here for example the eNB2 20, can be switched to an inactive state, e.g. due to energy saving reasons or the like. That is, it is determined in step S130 whether a switch condition for entering the inactive state is present. For example, the condition is met when the load or traffic in the cell of eNB2 20 is below a predetermined threshold (e.g. the first threshold described above), or the like.

If the decision in step S130 is negative, the load/traffic detection in the cells is continued, i.e. the process returns to step S120.

Otherwise, in case the condition for switching a transmission node to the inactive state is met in step S130 (YES), the control node 60 decides that a transmission node (i.e. eNB2 20) can enter the inactive step, and steps S140 and S150 are executed.

In step S140, the control node 60 sends an instruction to the eNB2 20 to switch to the inactive state as defined above (i.e., for example, to turn down DL signaling and the like). The instruction may comprise also a time information by means of which the actual switching of the eNB2 20 into the inactive mode may be timed (for example to be executed a predetermined time after receipt of the instruction, or the like). Thus, the transmission node (here eNB2 20) can be used during the inactive state as a sensor node and may measure specific information, such as uplink statistics like load balancing statistics by detecting UE random access channels (such as RACH according to LTE) indented for neighbor nodes which can be received by the transmission/sensor node, and/or interference statistics by detecting UL interference (IoT) at the sensor node.

Furthermore, in step S150, the control node 60 sends to the transmission node entering the inactive state with sensor mode (i.e. the sensor node) eNB2 20 uplink random access channel related information (such as RACH sequences and allowed access time intervals) related to neighboring nodes eNB1 10, eNB3 30 and eNB4 40, for example which are detectable for the eNB2 20 (e.g. due to cell overlap or the like). The respective information concerning RACH sequences and allowed access time intervals etc. related to the neighboring nodes eNB1 10, eNB3 30 and eNB4 40 are stored in the control node 60 (e.g. in its function as OAM entity) and may be provided beforehand by the transmission nodes being controlled by the control node 60 (e.g. some or all of the transmission nodes eNB1 10 to eNB5 50 shown in FIG. 1a) wherein only those information which are associated to a neighboring node of the transmission node decided to become inactive are considered. Hence, the control node 60 is able to provide the eNB2 20 with information identifying the target of the traffic monitoring to be conducted in the sensor mode, i.e. uplink random access channels of the neighboring cells with which the eNB2 20 cell has overlapping areas or the like. Thus, the eNB2 20 when being in the sensor mode is able to identify specific signaling from a UE towards a neighboring node which can be also detected/received by itself, and is able to allocate, for example, a received UE RACH towards a neighboring cell and can thus derive a corresponding load and traffic situation at this cell (i.e. at the cell edges and overlapping coverage areas).

It is to be noted that steps S140 and S150 may be also executed in a reverse order, i.e. the instruction to enter the inactive state is sent after the sending of the RACH related information of neighboring nodes. Alternatively, the transmission of the RACH related information concerning neighboring nodes may represent the trigger for entering the inactive state at the receiving node, i.e. steps S140 and S150 may be combined in one step.

Moreover, according to examples of embodiments of the invention, it is to be noted that the control node 60 may also inform the neighboring nodes of the transmission node to be switched into the inactive state about this decision, i.e. after step S130 (YES). However, in contrast to the first example, in the present example is may not be necessary to indicate in such an information that the transmission node to be deactivated is switched into a sensor mode. Alternatively, when informing the neighboring nodes about the fact that the transmission node is switched to the inactive state, this may also represent a trigger that the neighboring nodes sends the RACH related information to the identified inactive transmission node (i.e. eNB2 20), for example in accordance with messages M5 to M7 according to FIG. 2.

FIG. 6 shows a signaling diagram illustrating a signaling flow between the network elements involved in the control procedure based on FIG. 8.

After the message M11 including the setting information is sent to the eNB2 20 representing the sensor node is sent and a decision to switch the corresponding transmission node eNB2 20 into the inactive mode (according to step S130 (YES), messages M12 and M13 are sent from the control node to the eNB2 20, wherein in these messages the necessary information for conducting the sensor mode (i.e. the RACH related information indicated above) and the instruction to enter the inactive state (with sensor mode) are transmitted. As indicated above, the order of the messages M12 and M13 may be such as shown in FIG. 6, or reverse, or only one message may be sent. As a result, the eNB2 20 enters the inactive state and conducts the sensor mode. Messages M14 to M16 indicate signaling for informing the neighboring cells (eNB1 10, eNB3 30 and eNB4 40, for example) about the situation that the eNB2 20 is now inactive, as described above. Messages of this kind could also be sent by eNB2 20 itself to the neighboring cells (not shown in the figure).

When being in the sensor mode during inactive state, as described above, the eNB2 20 is able to identify specific signaling from a UE towards a neighboring node which can be also detected/received by itself. Thus, the eNB2 20 is able to allocate, for example, a received UE RACH towards a neighboring cell to a neighbor cell and can thus derive a corresponding load and traffic situation at this cell (i.e. at the cell edges and overlapping coverage areas). Processing and achieved results may be similar to those described in connection with step S70 according to FIG. 4.

In step S160, the control node 60 receives from the eNB2 20 being in the sensor mode a report related to the traffic monitoring conducted in the sensor mode. In other words, the control node 60 receives in step S160 results of the traffic monitoring which may comprise traffic load information, SOON statistics and the like. Such a report may be received periodically or after sending a request (not shown) from the control node 60 to the sensor node or triggered by an event.

As indicated above, according to the present second example of embodiments of the invention, as the deactivation/reactivation decision may be done centrally by the control node 60, in step S170, the control node 60 determines on the basis of the traffic monitoring reports received in step S160 whether a condition for switching the eNB2 20 into the active state is present or not. For example, the control node 60 may determine that the eNB2 20 should be activated on the basis of the results of the traffic monitoring, i.e. whether the RACH traffic meets a pre-defined criteria, e.g. exceeds a second predetermined threshold. The second predetermined threshold may be the same as the first threshold used in step S130, or may be different to that (greater or less), depending on the network configuration or operator setting, for example.

If the decision in step S170 is negative, the eNB2 20 is maintained in the inactive state with sensor mode, and the process returns to step S160.

Otherwise, in case the condition for switching the eNB2 20 to the active state is met in step S170 (YES), the control node 60 decides that the eNB2 20 shall enter the active state, and step S180 is executed.

In step S180, the control node 60 sends to the eNB2 20 an instruction to switch to the active state (i.e., for example, to turn on DL signaling, TX paths etc., i.e. to become fully operational again) and to stop the sensor mode (i.e. to stop monitoring of RACH traffic of the neighboring cells). The neighboring cells, i.e. eNB1 10, eNB3 30 and eNB4 40 may be informed about the entering of the active state by the eNB2 20.

Similar to the above described first example of embodiments of the invention, instruction to switch to the active state of the eNB2 20 may be also given by the control node 60 in reaction to a corresponding request by one of the neighboring transmission nodes, or due to a decision in the control node based on another reason (timer expiry or the like). Also in these cases the neighboring nodes may be informed about the reentering of the active state. Furthermore, in case a reactivation request is received from another (neighboring) transmission node, the requesting node may also be informed about the decision of the control node whether the inactive node is activated or not.

FIG. 7 shows an example for a signaling conducted in the communication network according to FIG. 1a when steps S160 to S180 according to FIG. 8 are conducted. Specifically, as shown in FIG. 7, when the eNB2 20 is in the inactive state and conducting the traffic monitoring in the sensor mode, it sends the reports regarding the traffic monitoring at the neighboring cells with a message M17 to the control node 60. If the control node 60 decides to switch the eNB2 20 into the active state (e.g. due to the positive decision in step S170), it sends an instruction to the eNB2 20 to enter the active state by means of message M18. Messages M19, M20 and M21 may be further sent from the control node 60 to the neighboring transmission nodes eNB1 10, eNB3 30 and eNB4 40 for informing them about the (re-)activation of the eNB2 20. Corresponding signaling may be also initiated by the re-activated eNB2 20.

As indicated above, according to the second example of embodiments of the invention, the information necessary to identify the targets for the traffic monitoring, such as RACH sequences, allowed access time intervals etc. of the neighboring cells, which is to be conducted by an inactive transmission node in sensor mode may be provided via the OAM entity. For this purpose, specific signaling between the involved nodes, i.e. for example the control node 60 and the transmission node switching into the inactive state (eNB2 20) and neighboring transmission nodes has to be provided. For example, exchange of corresponding information may be based on existing object models which can be extended by suitable information elements or the like.

Figure 9:
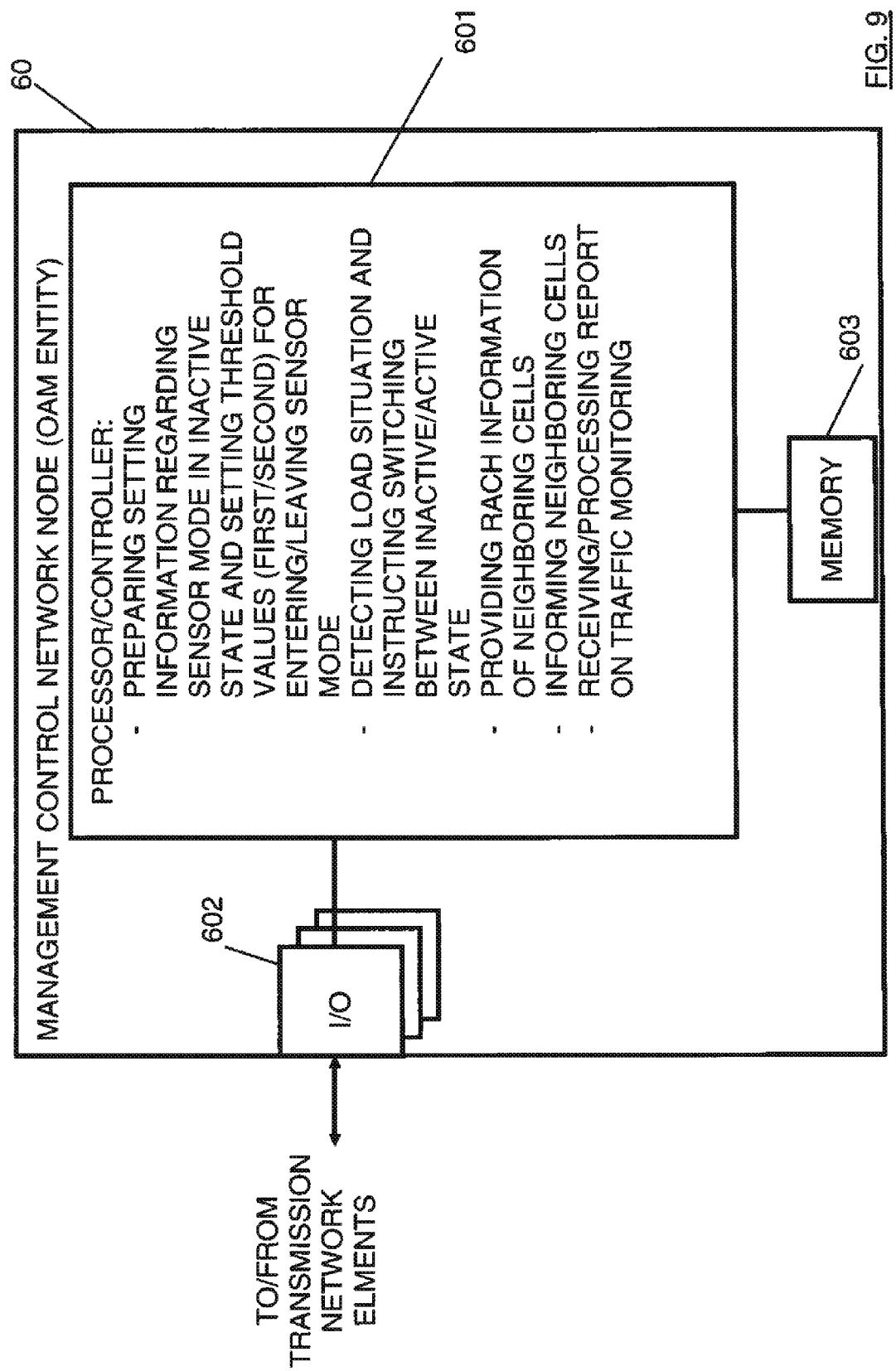
FIG. 9 shows a block circuit diagram illustrating a configuration of a management control network node according to the second example of embodiments of the invention.

In FIG. 9, a block circuit diagram of a control node such as a management control network node (e.g. an OAM entity represented by the control node 60) is shown which is configured to implement the processing as described in connection with FIG. 8. It is to be noted that the control node 60 shown in FIG. 8 may comprise several further elements or functions besides those described in connection therewith but which are omitted herein for the sake of simplicity as they are not essential for understanding the invention.

The control node 60 may comprise a processing function or processor 601, such as a CPU or the like, which executes instructions given by programs or the like related to the power control. The processor 601 may comprise further portions dedicated to specific processings described below. Portions for executing such specific processings may be also provided as discrete elements or within one or more further processors, for example. Reference signs 602 denote transceiver or input/output (I/O) units connected to the processor 601. The I/O units 602 may be used for communicating with the transmission nodes controlled by the control node 60, such as the eNBs 10 to 50 shown in FIG. 1a. The I/O units 602 may be a combined unit comprising the communication equipment towards all network elements in question, or may comprise a distributed structure with a plurality of different interfaces. Reference sign 603 denotes a memory usable, for example, for storing data and programs to be executed by the processor 601 and/or as a working storage of the processor 601.

The processor 601 is configured to execute processings related to the setting of a transmission node as a sensor node and for deactivation/reactivation of a corresponding transmission node (such as the eNB2 20) according to examples of embodiments of the invention. In particular, the processor 601 is usable for setting/switching the transmission node into the sensor mode and for activating the transmission node when required/requested, as described above. For example, the processor 601 is configured to prepare and send the setting information regarding the sensor mode for respective transmission nodes as well as for setting threshold values used for deciding on whether to enter or leave the inactive state (i.e. first and second thresholds), to detect a load situation in the cells, to decide to send an instruction to a transmission node for switching between the inactive state with sensor mode and the active state, to inform the neighboring nodes about the state currently entered (active/inactive) by a transmission node, to provide RACH information related to the neighboring nodes to be used in the traffic monitoring during the sensor mode of a transmission node, to receive and process reports on results of the traffic monitoring, and the like.

In the following, examples of embodiments of the invention regarding a format used for the information exchange, i.e. of the RACH related information, the setting information etc., is described. For example, the described formats may be implemented in the second example of embodiments of the invention as described in connection with FIGS. 6 to 9.

Specifically, the present examples for a format for the information are based on an object model description which may be used in a 3GPP LTE system.

First, an example A is described where a novel object class is introduced which holds the information about the RACH sequences (and also allowed access time intervals) to be monitored (i.e. sensed) by a cell, i.e. the transmission node thereof (like the eNB2 20). This example A is advantageous in that a clear separation of energy saving related items from the "normal" network resource model is possible. In the example A, an information object class (IOC) is used which may be referred to as "EnergySavingControlInformationOnCellLevel". This IOC represents control information which is relevant for energy saving functionality. It may be included, for example, in a cell IOC. In the following table 1, corresponding attributes are shown (M means "mandatory"), CM means "conditional-mandatory".

TABLE 1

| Attribute name | Support Qualifier | Read Qualifier | Write Qualifier |
|---|---|---|---|
| listOfRachSequencesToBeMonitored | CM | M | M |
| allowedAccessTimeIntervals | CM | M | M |
| rachMonitoringDuringES | M | M | M |
| loadThresholdToGoIntoSensorMode | CM | M | M |
| loadThresholdToLeaveSensorMode | CM | M | M |

Attribute "listOfRachSequencesToBeMonitored" shall have no duplicate entries.

Corresponding notifications are indicated in the following Table 2 (O means "optional").

TABLE 2

| Name | Qualifier | Notes |
|---|---|---|
| notifyAttributeValueChange | O | |
| notifyObjectCreation | O | |
| notifyObjectDeletion | O | |

In the following Table 3, a definition of the attribute "listOfRachSequencesToBeMonitored" is indicated which is present in the IOCs.

TABLE 3

| Attribute Name | Definition | Legal Values |
|---|---|---|
| ... (existing list extended by:) | ... | . |
| listOfRachSequences-ToBeMonitored | This attribute lists all RACH sequences which a cell in ES state "ES_RACH_Monitoring" shall monitor. Based on this monitoring a node may decide if it should return to full active mode. | |
| allowedAccess-TimeIntervals | This attribute determines the time intervals during which traffic monitoring of RACHs of neigbor cells are allowed. | |
| rachMonitoringDuring-ES | This attribute determines if a cell shall monitor RACH sequences when some or all of its active radio transmission units are switched off for Energy Saving purposes. The value of this attribute can be changed before, during or after the cell being in an energy saving state. | monitoring On, monitoring Off |
| loadThreshold-ToGoIntoSensorMode | This attribute describes the threshold level the crossing of which is used as trigger to go into sensor mode during ES. | |
| loadThreshold-ToLeaveSensorMode | This attribute describes the threshold level the crossing of which is used as trigger to leave the ES sensor mode and return to the active mode. | |

Next, an example B is described where an existing cell object is extended by a new attribute. This example B is advantageous in that no new object class needs to be introduced.

In the example B, an abstract IOC may be used which may be referred to as "EUtranGenericCell". This abstract IOC represents the common properties of an E-UTRAN generic cell.

Attributes of this IOC are shown in Table 4, wherein one of the new attributes is e.g. "listOfRachSequencesToBeMoni-tared" (M means "mandatory", CM means "conditionalmandatory", O means "optional").

TABLE 4

| Attribute name | Support Qualifier | Read Qualifier | Write Qualifier |
|---|---|---|---|
| Id | M | M | — |
| cellIdentity | M | M | M |
| cellType | M | M | — |
| cellSize | M | M | M |
| plmnIdList | M | M | M |
| tac | M | M | M |
| pci | M | M | CM |
| pciList | CM | M | M |
| maximumTransmission Power | M | M | CM |
| referenceSignalPower | M | M | M |
| Pb | M | M | M |
| partOfSectorPower | CM | M | M |
| listOfRachSequences ToBeMonitored | CM | M | M |
| allowedAccess-TimeIntervals | CM | M | M |
| rachMonitoringDuring ES | M | M | M |
| loadThreshold-ToGoIntoSensorMode | CM | M | M |
| loadThreshold-ToLeaveSensorMode | CM | M | M |
| operational-State | O | M | — |
| administrative State | O | M | M |
| availabilityStatus | O | M | — |

NOTE:
No state or status propagation shall be implied.

Attribute constraints of these attributes are indicated in the following Table 5:

TABLE 5

| Name | Definition |
|---|---|
| pci CM Write Qualifier | Centralized PCI assignment is supported. |
| pciList CM Support Qualifier | Distributed PCI assignment-is supported. |
| partOfSectorPower CM support qualifier | The IOC SectorEquipment Function is used. |
| maximumTransmissionPower CM Write Qualifier | The IOC SectorEquipmentFunction is not used. |
| listOfRachSequencesToBeMonitored CM Support Qualifier | rachMonitoringDuringES has value monitoringOn |
| allowedAccessTimeIntervals CM Support Qualifier | rachMonitoringDuringES has value monitoringOn |
| loadThresholdToGoIntoSensorMode CM Support Qualifier | rachMonitoringDuringES has value monitoringOn |
| loadThresholdToLeaveSensorMode CM Support Qualifier | rachMonitoringDuringES has value monitoringOn |

In Table 6, a definition and legal values of the attributes that are present in corresponding IOCs are provided.

TABLE 6

| Attribute Name | Definition | Legal Values |
|---|---|---|
| ... (existing list extended by:) | ... | . |
| listOfRachSequences-ToBeMonitored | This attribute lists all RACH sequences which a cell in ES state | |

TABLE 6-continued

| Attribute Name | Definition | Legal Values |
|---|---|---|
| | "ES_RACH_Monitoring" shall monitor. Based on this monitoring a node may decide if it should return to full active mode. | |
| allowedAccess-TimeIntervals | This attribute determines the time intervals during which traffic monitoring o RACHs of neigbor cells are allowed. | |
| rachMonitoring-DuringES | This attribute determines if a cell shall monitor RACH sequences when some or all of its active radio transmission units are switched off for Energy Saving purposes. The value of this attribute can be changed before, during or after the cell being in an energy saving state. | monitoring On, monitoring Off |
| loadThreshold-ToGoIntoSensor-Mode | This attribute describes the threshold level the crossing of which is used as trigger to go into sensor mode during ES. | |
| loadThreshold-ToLeaveSensorMode | This attribute describes the threshold level the crossing of which is used as trigger to leave the ES sensor mode and return to the active mode. | |

With regard to the setting information by means of which a transmission node is informed about its selection as a sensor node, also a specific attribute may be used which may be implemented, for example, in any of the first and second examples described above with reference to FIGS. 1 to 9.

For example, an attribute indicated as "rachMonitoring-DuringES" may be used. A corresponding attribute may be included in the above mentioned IOCs, i.e. in IOC "EnergySavingControlInformationOnCellLevel" or IOC "EUtranGenericCell".

In addition, a corresponding attribute may be used on subnetwork level, wherein a corresponding IOC "EnergySaving-ControlInformationOnSubnetworkLevel" may be used (similar to above described example A). Subnetwork level refers to, for example, a home network or the like having an own controller. An advantage of the latter example is that OAM is easier, because this property would not needed to be set per individual cell.

In Table 7 a definition and legal values of the attributes "rachMonitoringDuringES" etc. are provided.

TABLE 7

| Attribute Name | Definition | Legal Values |
|---|---|---|
| . . . (existing list extended by:) | . . . | . |
| rachMonitoring-DuringES | This attribute determines if a cell shall monitor RACH sequences when some or all of its active radio transmission units are switched off for Energy Saving purposes. The value of this attribute can be changed before, during or after the cell being in an energy saving state. | monitoring On, monitoring Off |
| loadThreshold-ToGoIntoSensor-Mode | This attribute describes the threshold level the crossing of which is used as trigger to go into sensor mode during ES. | |
| loadThreshold-ToLeaveSensorMode | This attribute describes the threshold level the crossing of which is used as trigger to leave the ES sensor mode and return to the active mode. | |

It is to be noted that the above described examples of embodiments of the invention are related to 3GPP LTE standards and more specifically to network procedures, when heterogeneous access nodes like relays and low power nodes (e.g. hotspots, pico and femto nodes) are deployed in co-channel mode to keep the UE power consumption at reasonable level in the system whilst reducing the network energy needs during off peak hours. Specifically, examples of embodiments of the invention are usable with LTE FDD technology and may be implemented most efficiently if access nodes (i.e. transmission nodes) are running synchronized.

According to examples of embodiments of the invention, there is provided an apparatus comprising receiving means configured to receive a setting information indicating to operate in a sensor mode when an operation mode of the apparatus is changed to an inactive state, wherein the sensor mode comprises traffic monitoring on at least one uplink random access channel of at least one neighboring cell, processing means configured to change the operation mode of the apparatus to the inactive state when a predetermined condition is met, and monitoring means configured to conduct traffic monitoring of random access channel signals detectable by the apparatus on at least one uplink random access channel of at least one neighboring cell when the apparatus is in the inactive state.

Furthermore, according to examples of embodiments of the invention, there is provided an apparatus comprising receiving means configured to receive an indication from a transmission node of a neighboring cell that the transmission node of the neighboring cell enters an inactive state and operates in a sensor mode, wherein the sensor mode comprises traffic monitoring on at least one uplink random access channel of the apparatus, and transmitting means configured to send to the transmission node of the neighboring cell channel sequence information and information on allowed access time intervals of at least one uplink random access channel to be monitored in the sensor mode.

Moreover, according to examples of embodiments of the invention, there is provided an apparatus comprising transmitting means configured to send to at least one transmission network element a setting information indicating that the at least one transmission network element has to operate in a sensor mode when an operation mode of the at least one transmission network element is changed to an inactive state, wherein the sensor mode comprises traffic monitoring on at least one uplink random access channel of at least one neighboring cell of the at least one transmission network element.

For the purpose of the present invention as described herein above, it should be noted that an access technology via which signaling is transferred to and from a network element or node may be any technology by means of which a node can access an access network (e.g. via a base station or generally an access node). Any present or future technology, such as WLAN (Wireless Local Access Network), WiMAX (Worldwide Interoperability for Microwave Access), BlueTooth, Infrared, and the like may be used; although the above technologies are mostly wireless access technologies, e.g. in different radio spectra, access technology in the sense of the present invention implies also wired technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto, usable access networks and transmission nodes may be any device, apparatus, unit or means by which a station, entity or other user equipment may connect to and/or utilize services offered by the access network; such services include, among others, data and/or (audio-)visual communication, data download etc.;

a user equipment may be any device, apparatus, unit or means by which a system user or subscriber may experience services from an access network, such as a mobile phone, personal digital assistant PDA, or computer;

method steps likely to be implemented as software code portions and being run using a processor at a network element or terminal (as examples of devices, apparatuses and/or modules thereof, or as examples of entities including apparatuses and/or modules for it), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

As described above, there is proposed a mechanism for power saving procedures to be conducted in transmission network nodes, such as base stations or the like, in a heterogeneous network environment. A transmission node is set to operate in a sensor mode for conducting traffic monitoring when an operation mode of the transmission node is an inactive state. Information necessary for the traffic monitoring by the transmission node based on detection of random access channel (RACH) signals of neighboring cells is provided. On the basis of results of the monitoring of RACHs of the neighboring cells, it is determined whether the inactive transmission node is to be reactivated.

Although the present invention has been described herein before with reference to particular embodiments thereof, the present invention is not limited thereto and various modifications can be made thereto.

The invention claimed is:

1. Apparatus comprising:
memory comprising computer program code, and
at least one processor,
the memory and the computer program code configured, with the at least one processor, to cause the apparatus to perform at least the following:
receive a setting information indicating to operate in a sensor mode when an operation mode of the apparatus is changed to an inactive state, wherein the sensor mode comprises traffic monitoring on at least one uplink random access channel of at least one neighboring cell,
change the operation mode of the apparatus to the inactive state in response to a predetermined condition being met, and conduct traffic monitoring of random access channel signals detectable by the apparatus on at least one uplink random access channel of at least one neighboring cell when the apparatus is in the inactive state.

2. The apparatus according to claim 1, wherein the memory and the computer program code are further configured, with the at least one processor, to cause the apparatus to perform at least the following: detect a traffic load of an own cell associated to the apparatus when being in an active mode, wherein the predetermined condition is met in response to the traffic load detected being below a predetermined first threshold.

3. The apparatus according to claim 2, wherein the memory and the computer program code are further configured, with the at least one processor, to cause the apparatus to perform at least the following:
determine on the basis of the traffic monitoring result whether the traffic load is greater than a second predetermined threshold, and trigger changing of the operation mode of the apparatus from the inactive state to an active state in response to the traffic load being greater than the second predetermined threshold.

4. The apparatus according to claim 1, wherein the memory and the computer program code are further configured, with the at least one processor, to cause the apparatus to perform at least the following:
receive an instruction from a management network control element to change the operation mode to the inactive state, wherein the predetermined condition is met when the instruction is received,
receive from the management network control element channel sequence information and information on allowed access time intervals of at least one uplink random access channel to be monitored in the sensor mode, and
use the channel sequence information and information on allowed access time intervals for the traffic monitoring of the at least one uplink random access channel of the at least one neighboring cell.

5. The apparatus according to claim 4, wherein the memory and the computer program code are further configured, with the at least one processor, to cause the apparatus to perform at least the following:
receive a further instruction from a management network control element to change the operation mode from the inactive state to an active state, and
trigger changing the operation mode of the apparatus from the inactive state to the active state in response to the further instruction being received.

6. The apparatus according to claim 1, wherein the memory and the computer program code are further configured, with the at least one processor, to cause the apparatus to perform at least the following: report a result of the traffic monitoring of the at least one uplink random access channel of the at least one neighboring cell when the apparatus is in the sensor mode to a management network control element.

7. The apparatus according to claim 1, wherein the apparatus is comprised in a transmission network element of a communication network.

8. An apparatus comprising
a transmitter configured to send to at least one transmission network element a setting information indicating that the at least one transmission network element has to operate in a sensor mode when an operation mode of the at least one transmission network element is changed to an inactive state, wherein the sensor mode comprises traffic monitoring on at least one uplink random access channel of at least one neighboring cell of the at least one transmission network element.

9. The apparatus according to claim 8, wherein:
the apparatus further comprises memory comprising computer program code, and at least one processor,
the memory and the computer program code configured, with the at least one processor, to cause the apparatus to perform at least the following:
receive a report of a result of the random access traffic monitoring by the at least one transmission network element in the sensor mode,
process the received report for determining whether the traffic load in the cell of the at least one transmission network element is greater than a second predetermined threshold, and
the transmitter is further configured to send, in response to determining that the traffic load in the cell of the at least one transmission network element is greater than the second predetermined threshold, a further instruction to the at least one transmission network element to change the operation mode from the inactive state to an active state.

10. The apparatus according to claim 8, wherein the apparatus is comprised in at least one of a network entity of a communication network functioning generating a self organized and optimized network, and a management control network element.

11. A method comprising:
receiving a setting information indicating to operate in a sensor mode in response to an operation mode being changed to an inactive state, wherein the sensor mode comprises traffic monitoring on at least one uplink random access channel of at least one neighboring cell,
changing the operation mode to the inactive state in response to a predetermined condition being met, and
conducting traffic monitoring of random access channel signals on at least one uplink random access channel of at least one neighboring cell in response to the operation mode being changed to the inactive state.

12. The method according to claim 11, further comprising detecting a traffic load in an own cell during an active mode, wherein the predetermined condition is met in response to the traffic load detected being below a predetermined first threshold.

13. The method according to claim 12, further comprising determining on the basis of a result of the traffic monitoring whether the traffic load is greater than a second predetermined threshold, and
triggering a change of the operation mode from the inactive state to an active state when in response to the traffic load being greater than the second predetermined threshold.

14. The method according to claim 11, further comprising receiving an instruction from a management network control element to change the operation mode to the inactive state, wherein the predetermined condition is met in response to the instruction being received, and
receiving from the management network control element channel sequence information and information on allowed access time intervals of at least one uplink random access channel to be monitored in the sensor mode, wherein the channel sequence information and the information on allowed access time intervals are used for the traffic monitoring of the at least one uplink random access channel of the at least one neighboring cell.

15. The method according to claim 14, further comprising
receiving a further instruction from a management network control element to change the operation mode from the inactive state to an active state, and
triggering a change of the operation mode from the inactive state to the active state in response to the further instruction being received.

16. The method according to claim 11, further comprising
reporting a result of the traffic monitoring of the at least one uplink random access channel of the at least one neighboring cell in the sensor mode to a management network control element.

17. The method according to claim 11, wherein the method is executed in a transmission network element of a communication network.

18. A method comprising
sending to at least one transmission network element a setting information indicating that the at least one transmission network element has to operate in a sensor mode when an operation mode of the at least one transmission network element is changed to an inactive state, wherein the sensor mode comprises traffic monitoring on at least one uplink random access channel of at least one neighboring cell of the at least one transmission network element.

19. The method according to claim 18, further comprising
receiving a report of a result of the random access traffic monitoring by the at least one transmission network element in the sensor mode,
processing the received report for determining whether the traffic load in the cell of the at least one transmission network element is greater than a second predetermined threshold, and
sending, in response to a determination that the traffic load in the cell of the at least one transmission network element is greater than the second predetermined threshold, a further instruction to the at least one transmission network element to change the operation mode from the inactive state to an active state.

20. The method according to claim 18, wherein the method is executed in at least one of a network entity of a communication network functioning generating a self organized and optimized network, and a management control network element.

* * * * *